(12) United States Patent
Ryu et al.

(10) Patent No.: US 12,034,544 B2
(45) Date of Patent: Jul. 9, 2024

(54) METHODS AND APPARATUS TO FACILITATE A MULTIPLE BIT NEW DATA INDICATOR

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/231,783

(22) Filed: Apr. 15, 2021

(65) Prior Publication Data

US 2021/0328727 A1  Oct. 21, 2021

Related U.S. Application Data

(60) Provisional application No. 63/011,997, filed on Apr. 17, 2020.

(51) Int. Cl.
*H04L 1/1812* (2023.01)
*H04L 1/00* (2006.01)
(Continued)

(52) U.S. Cl.
CPC ............ *H04L 1/1819* (2013.01); *H04L 1/003* (2013.01); *H04L 1/189* (2013.01); *H04W 72/23* (2023.01)

(58) Field of Classification Search
CPC ....... H04L 1/1819; H04L 1/003; H04L 1/189; H04L 1/1896; H04L 1/1812; H04L 1/1893; H04W 72/042
See application file for complete search history.

(56) References Cited

U.S. PATENT DOCUMENTS

2009/0271679 A1* 10/2009 Harada ................. H04L 1/1812
　　　　　　　　　　　　　　　　　　　　714/748
2017/0026297 A1*  1/2017 Sun ........................ H04L 47/25
(Continued)

FOREIGN PATENT DOCUMENTS

EP   　  3621230 A1   3/2020
WO   2018143857 A1   8/2018
WO   2020005125 A1   1/2020

OTHER PUBLICATIONS

Ericsson: "Feature Lead Summary #3 for Scheduling of Multiple DL/UL Transport Blocks for LTE-MTC", 3GPP Draft, 3GPP TSG-RAN WG1 Meeting #99, R1-1913448, 3rd Generation Partnership Project (3GPP), Mobile Competence Centre, 650, Route Des Lucioles, F-06921 Sophia-Antipolis Cedex, France, vol. RAN, WG1, No. Reno, USA, Nov. 18, 2019-Nov. 22, 2019, Nov. 25, 2019 (Nov. 25, 2019), XP051830727, 11 Pages, URL: https://ftp.3gpp.org/tsg_ran/WG1_RL1/TSGR1_99/Docs/R1-1913448.zip.R1-1913448, [retrieved on Nov. 25, 2019] paragraph [0003].

(Continued)

*Primary Examiner* — Jae Y Lee
(74) *Attorney, Agent, or Firm* — Procopio, Cory, Hargreaves & Savitch LLP/QUALCOMM Incorporated

(57) ABSTRACT

Apparatus, methods, and computer-readable media for facilitating a multiple bit new data indicator are disclosed herein. An example method for wireless communication at a first device includes transmitting a first state of a multiple bit new data indicator (NDI) for a first packet. The example multiple bit NDI indicates more than two different states for indicating a new packet. The example method also includes transmitting the first packet. Additionally, the example method includes transmitting a second state of the multiple bit NDI for a second packet, and the second state being (Continued)

different than the first state. Further, the example method includes transmitting the second packet.

42 Claims, 13 Drawing Sheets

(51) Int. Cl.
*H04L 1/1867* (2023.01)
*H04W 72/23* (2023.01)

(56) References Cited

U.S. PATENT DOCUMENTS

| | | | |
|---|---|---|---|
| 2018/0145797 A1* | 5/2018 | Yeo | H04L 1/1812 |
| 2018/0176903 A1* | 6/2018 | Lee | H04W 72/04 |
| 2019/0074929 A1 | 3/2019 | Aiba et al. | |
| 2019/0140783 A1* | 5/2019 | Yerramalli | H04L 1/1816 |
| 2019/0356415 A1* | 11/2019 | Peng | H04L 1/0052 |
| 2020/0099474 A1 | 3/2020 | Wikstrom et al. | |
| 2021/0006318 A1 | 1/2021 | Kim et al. | |
| 2021/0212086 A1 | 7/2021 | Li et al. | |
| 2021/0320755 A1 | 10/2021 | Faxer et al. | |
| 2021/0328721 A1 | 10/2021 | Ryu | |
| 2021/0328723 A1 | 10/2021 | Akkarakaran et al. | |
| 2021/0385029 A1 | 12/2021 | Guo et al. | |
| 2022/0174682 A1 | 6/2022 | Li et al. | |
| 2022/0217760 A1 | 7/2022 | Iyer et al. | |
| 2022/0240289 A1 | 7/2022 | Karaki et al. | |
| 2022/0255670 A1* | 8/2022 | Zhang | H04L 1/1864 |

OTHER PUBLICATIONS

International Search Report and Written Opinion—PCT/US2021/027777—ISA/EPO—dated Jul. 9, 2021.
Qualcomm Incorporated: "Potential Enhancements to DL Control signalling", 3GPP Draft, 3GPP TSG RAN WG1 #82, R1-153859, Potential Enhancements to DL Control signalling, 3rd Generation Partnership Project (3GPP), Mobile Competence Centre, 650, Route Des Lucioles, F-06921 Sophia-Antipolis Cedex, vol. RAN WG1, No. Beijing, China, Aug. 24, 2015-Aug. 28, 2015, Aug. 23, 2015 (Aug. 23, 2015), XP051001296, 4 Pages, Retrieved from the Internet: URL: http://www.3gpp.org/ftp/Meetings_3GPP_SYNC/RAN1/Docs/. [Retrieved on Aug. 23, 2015] table.
ZTE: "Remaining Issues on Scheduling Enhancement for MTC", 3GPP Draft, 3GPP TSG RAN WG1 Meeting #100 bis, R1-2001852, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 24, 2020, Apr. 10, 2020 (Apr. 10, 2020), XP051873336, 17 Pages, Retrieved from the Internet: URL: https://ftp.3gpp.org/tsg_ran/WG1_RL1/TSGR1_100b_e/Docs/R1-2001852.zip.R1-2001852, [retrieved on Apr. 10, 2020] p. 11.
3GPP TS 38.214, "3rd Generation Partnership Project, Technical Specification Group Radio Access Network, NR, Physical Layer Procedures for Data (Release 15)", 3GPP TS 38.214, V15.9.0, Mar. 31, 2020 (Mar. 31, 2020), 105 Pages, sections 5-6, sections 5.1.7, 5.1.7.1 and 5.1.7.2.

* cited by examiner

METHODS AND APPARATUS TO FACILITATE A MULTIPLE BIT NEW DATA INDICATOR

CROSS REFERENCE TO RELATED APPLICATION(S)

This application claims the benefit of U.S. Provisional Patent Application Ser. No. 63/011,997, entitled "Methods and Apparatus to Facilitate a Multiple Bit New Data Indicator," and filed on Apr. 17, 2020, which is expressly incorporated by reference herein in its entirety.

INTRODUCTION

The present disclosure relates generally to communication systems, and more particularly, to communication systems utilizing downlink transmissions.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a first device. The method includes transmitting a first state of a multiple bit new data indicator (NDI) for a first packet. The method also includes transmitting the first packet. Additionally, the method includes transmitting a second state of the multiple bit NDI for a second packet. The method further includes transmitting the second packet.

In another aspect of the disclosure, an apparatus for wireless communication at a first device is provided. The apparatus includes means for transmitting a first state of a multiple bit NDI for a first packet. The apparatus also includes means for transmitting the first packet. Additionally, the apparatus includes means for transmitting a second state of the multiple bit NDI for a second packet. The apparatus further includes means for transmitting the second packet.

In another aspect of the disclosure, an apparatus for wireless communication at a first device is provided. The apparatus includes memory and at least one processor coupled to the memory. The memory and the at least one processor are configured to transmit a first state of a multiple bit NDI for a first packet. The memory and the at least one processor may also be configured to transmit the first packet. Additionally, the memory and the at least one processor may be configured to transmit a second state of the multiple bit NDI for a second packet. The memory and the at least one processor may further be configured to transmit the second packet.

In another aspect of the disclosure, a computer-readable medium storing computer executable code for wireless communication at a first device is provided. The code, when executed, causes a processor to transmit a first state of a multiple bit NDI for a first packet. The code, when executed, may also cause the processor to transmit the first packet. Additionally, the code, when executed, may cause the processor to transmit a second state of the multiple bit NDI for a second packet. The code, when executed, may further cause the processor to transmit the second packet.

In another aspect of the disclosure, a method is provided for wireless communication at a first device. The method includes receiving a first state of a multiple bit NDI for a first packet. The method also includes receiving the first packet based on the first state of the multiple bit NDI. Additionally, the method includes receiving a second state of the multiple bit NDI for a second packet. The method further includes receiving the second packet based on the second state of the multiple bit NDI.

In another aspect of the disclosure, an apparatus for wireless communication at a first device is provided. The apparatus includes means for receiving a first state of a multiple bit NDI for a first packet. The apparatus also includes means for receiving the first packet based on the first state of the multiple bit NDI. Additionally, the apparatus includes means for receiving a second state of the multiple bit NDI for a second packet. The apparatus further includes means for receiving the second packet based on the second state of the multiple bit NDI.

In another aspect of the disclosure, an apparatus for wireless communication at a first device is provided. The apparatus includes memory and at least one processor coupled to the memory. The memory and the at least one processor are configured to receive a first state of a multiple bit NDI for a first packet. The memory and the at least one processor may also be configured to receive the first packet based on the first state of the multiple bit NDI. Additionally, the memory and the at least one processor may be configured to receive a second state of the multiple bit NDI for a second packet. The memory and the at least one processor may further be configured to receive the second packet based on the second state of the multiple bit NDI.

In another aspect of the disclosure, a computer-readable medium storing computer executable code for wireless communication at a first device is provided. The code, when executed, causes a processor to receive a first state of a multiple bit NDI for a first packet. The code, when executed, may also cause the processor to receive the first packet based on the first state of the multiple bit NDI. Additionally, the code, when executed, may cause the processor to receive a second state of the multiple bit NDI for a second packet. The code, when executed, may further cause the processor to receive the second packet based on the second state of the multiple bit NDI.

In another aspect of the disclosure, a method is provided for wireless communication at a first device. The method includes transmitting a first state of a multiple bit NDI for a first packet, the multiple bit NDI indicating more than two different states for indicating a new packet. The method also includes transmitting the first packet. Additionally, the method includes transmitting a second state of the multiple bit NDI for a second packet, the second state being different than the first state. The method further includes transmitting the second packet.

In another aspect of the disclosure, an apparatus for wireless communication at a first device is provided. The apparatus includes means for transmitting a first state of a multiple bit NDI for a first packet, the multiple bit NDI indicating more than two different states for indicating a new packet. The apparatus also includes means for transmitting the first packet. Additionally, the apparatus includes means for transmitting a second state of the multiple bit NDI for a second packet, the second state being different than the first state. The apparatus further includes means for transmitting the second packet.

In another aspect of the disclosure, an apparatus for wireless communication at a first device is provided. The apparatus includes memory and at least one processor coupled to the memory. The memory and the at least one processor are configured to transmit a first state of a multiple bit NDI for a first packet, the multiple bit NDI indicating more than two different states for indicating a new packet. The memory and the at least one processor may also be configured to transmit the first packet. Additionally, the memory and the at least one processor may be configured to transmit a second state of the multiple bit NDI for a second packet, the second state being different than the first state. The memory and the at least one processor may further be configured to transmit the second packet.

In another aspect of the disclosure, a computer-readable medium storing computer executable code for wireless communication at a first device is provided. The code, when executed, causes a processor to transmit a first state of a multiple bit NDI for a first packet, the multiple bit NDI indicating more than two different states for indicating a new packet. The code, when executed, may also cause the processor to transmit the first packet. Additionally, the code, when executed, may cause the processor to transmit a second state of the multiple bit NDI for a second packet, the second state being different than the first state. The code, when executed, may further cause the processor to transmit the second packet.

In another aspect of the disclosure, a method is provided for wireless communication, with a first device, at a second device. The method includes receiving a first state of a multiple bit NDI for a first packet, the multiple bit NDI indicating more than two different states for indicating a new packet. The method also includes receiving the first packet based on the first state of the multiple bit NDI. Additionally, the method includes receiving a second state of the multiple bit NDI for a second packet, the second state being different than the first state. The method further includes receiving the second packet based on the second state of the multiple bit NDI.

In another aspect of the disclosure, an apparatus for wireless communication, with a first device, at a second device is provided. The apparatus includes means for receiving a first state of a multiple bit NDI for a first packet, the multiple bit NDI indicating more than two different states for indicating a new packet. The apparatus also includes means for receiving the first packet based on the first state of the multiple bit NDI. Additionally, the apparatus includes means for receiving a second state of the multiple bit NDI for a second packet, the second state being different than the first state. The apparatus further includes means for receiving the second packet based on the second state of the multiple bit NDI.

In another aspect of the disclosure, an apparatus for wireless communication, with a first device, at a second device is provided. The apparatus includes memory and at least one processor coupled to the memory. The memory and the at least one processor are configured to receive a first state of a multiple bit NDI for a first packet, the multiple bit NDI indicating more than two different states for indicating a new packet. The memory and the at least one processor may also be configured to receive the first packet based on the first state of the multiple bit NDI. Additionally, the memory and the at least one processor may be configured to receive a second state of the multiple bit NDI for a second packet, the second state being different than the first state. The memory and the at least one processor may further be configured to receive the second packet based on the second state of the multiple bit NDI.

In another aspect of the disclosure, a computer-readable medium storing computer executable code for wireless communication, with a first device, at a second device is provided. The code, when executed, causes a processor to receive a first state of a multiple bit NDI for a first packet, the multiple bit NDI indicating more than two different states for indicating a new packet. The code, when executed, may also cause the processor to receive the first packet based on the first state of the multiple bit NDI. Additionally, the code, when executed, may cause the processor to receive a second state of the multiple bit NDI for a second packet, the second state being different than the first state. The code, when executed, may further cause the processor to receive the second packet based on the second state of the multiple bit NDI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
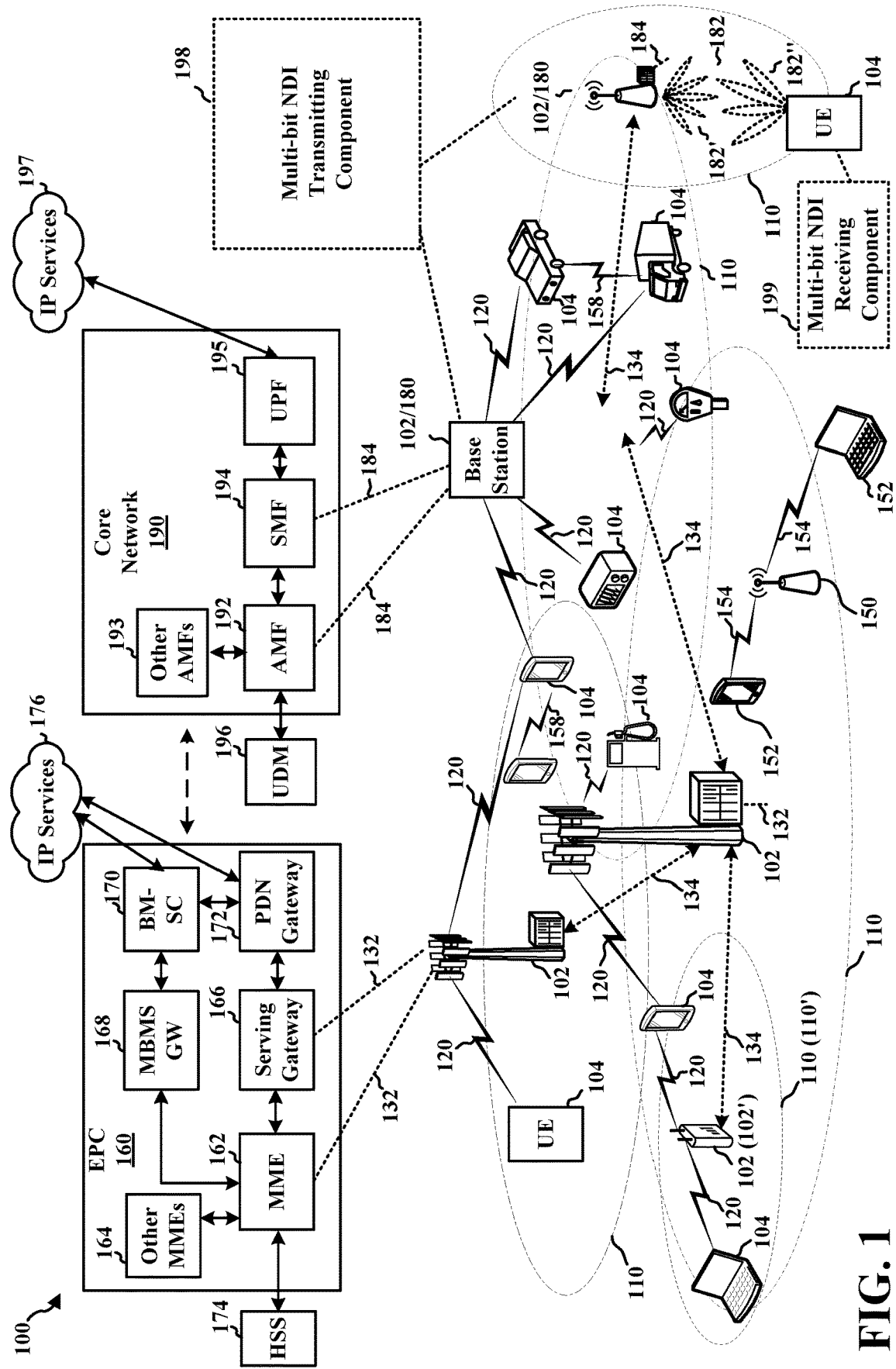
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

Hybrid automatic repeat request (HARD) feedback refers to a protocol in which a receiver checks for errors in received data and if an error is detected, then the receiver buffers the received data (e.g., in a decoding buffer) and requests a retransmission from a transmitter. The receiver may then be able to combine the buffered data with the retransmitted data prior to performing processing of the data (e.g., performing channeling decoding and/or error detection). The performing of HARQ feedback may facilitate improving the reliability of a data transmission by managing the transmission (and re-transmission) of data from the transmitter to the receiver.

Downlink HARQ refers to the transmitting of downlink data on a downlink data channel (e.g., PDSCH) with HARQ feedback returned on either an uplink control channel (e.g., PUCCH) or an uplink data channel (e.g., PUSCH). In some examples, the transmitter of the downlink data (e.g., a base station) may transmit downlink resource allocations on a downlink control channel (e.g., PDCCH) using downlink control information (DCI). The DCI may include one or more information elements, such as a new data indicator (NDI) and a HARQ attempt number, that may be useful for the performing of downlink HARQ. In some examples, the NDI may be a single bit flag used to indicate to the receiver of the downlink data (e.g., a UE) of whether the transmitter is transmitting a new (e.g., an initial) transmission of a packet or transmitting a retransmission. The transmitter may toggle the value of the NDI relative to a prior transmission to indicate that new data (e.g., a new packet) is being sent rather than a retransmission. The HARQ attempt number may indicate a quantity of HARQ attempts that have been performed for transmitting a packet. For example, when the transmitter transmits a packet, the transmitter may buffer the packet in a transmit buffer until the transmitter receives acknowledgement that the packet was successfully received at the receiver (e.g., via an ACK message) or the transmitter has attempted a maximum quantity of HARQ attempts (e.g., 8 attempts, 16 attempts, etc.). In such examples, the transmitter may clear the transmit buffer after receiving the acknowledgement (e.g., an ACK message) or the maximum quantity of HARQ attempts is reached.

In some examples, it may be possible for the receiver to not receive all HARQ attempts associated with a packet. For example, the receiver may successfully receive a first packet from the transmitter at a time T1. The receiver may then miss the initial transmission and the maximum quantity of retransmissions of a second packet. The receiver may then successfully receive a third packet from the transmitter at a time T3. In some such examples, the receiver may transmit a first positive acknowledgement (e.g., an ACK message) to the transmitter indicating that the receiver successfully received the first packet at the time T1 and may transmit another positive acknowledgement (e.g., an ACK message) to the transmitter indicating that the receiver successfully received the third packet at the time T3. However, as the values of the NDIs associated with the successfully received first and third packets is the same (e.g., a "0"), the receiver may determine that the third packet is a retransmission of the first packet.

Example techniques disclosed herein provide an NDI that is robust and reliably provides an indication to the receiver that a new packet is being transmitted. For example, disclosed techniques enable a transmitter (e.g., a base station) to transmit a downlink transmission including a multiple bit NDI (e.g., a "multi-bit" NDI). For example, for an NDI having N possible states, the NDI may be an M-bit NDI having states $0, 1, \ldots 2^M-1$. In such examples, the transmitter may rotate through the N states for each new packet.

Furthermore, disclosed techniques enable the multiple bit NDI to include a first portion corresponding to an identifier for a new packet and a second portion corresponding to a HARQ transmission index. For example, the first portion of the multiple bit NDI may be M-bits that enable the value of the NDI to rotate (e.g., cycle or traverse) between N possible states (e.g., states $0, 1, \ldots 2^M-1$). The second portion of the multiple bit NDI may correspond to the HARQ transmission index (sometimes referred to as a "HARQ transmission attempt," "a HARQ attempt identifier," or a "HARQ attempt number") for the respective packet. For example, if the maximum quantity of HARQ attempts is set to eight HARQ attempts, the HARQ transmission index may range from zero to seven, where HARQ transmission index of zero represents an initial transmission of a packet and HARQ transmission indexes one to seven represent respective retransmissions of the respective packet.

Thus, it may be appreciated that aspects presented herein may improve communication between a transmitter and a receiver by providing a multiple bit NDI that rotates (e.g., cycles or traverses) through more than two different states for indicating a new packet. According to one example, the transmitter may be configured to transmit downlink transmissions to the receiver as well as transmit the multiple bit NDI. In some examples, the NDI may further include a HARQ attempt identifier. The multiple bit NDI may be configured to indicate to the receiver whether the transmitter is transmitting a new (e.g., an initial) transmission of a packet or transmitting a retransmission. For example, for an M-bit NDI, the transmitter may rotate (e.g., cycle or traverse) through N states relative to a prior transmission, where N includes the states $0, 1, \ldots 2^M-1$, to indicate when new data (e.g., a new packet) is being sent rather than a retransmission.

FIG. 1 is a diagram illustrating an example of a wireless communications system and an access network 100 that includes UEs 104 in communication with base stations 102 or base stations 180. As an example, in FIG. 1, the base station 102/180 may include a multi-bit NDI transmitting component 198. In certain aspects, the multi-bit NDI transmitting component 198 may be configured to transmit a first state of a multiple bit NDI for a first packet. The multiple bit NDI may be configured to indicate more than two different states for indicating a new packet. The example multi-bit NDI transmitting component 198 may also be configured to transmit the first packet. Additionally, the example multi-bit NDI transmitting component 198 may be configured to transmit a second state of the multiple bit NDI for a second packet, the second state being different than the first state. The example multi-bit NDI transmitting component 198 may also be configured to transmit the second packet.

Still referring to FIG. 1, in certain aspects, the UE 104 may be configured to manage one or more aspects of wireless communication by processing a multi-bit NDI for downlink transmissions. As an example, in FIG. 1, the UE 104 may include a multi-NDI receiving component 199. In certain aspects, the multi-NDI receiving component 199 may be configured to receive a first state of a multiple bit NDI for a first packet. The multiple bit NDI may be configured to indicate more than two different states for indicating a new packet. The example multi-NDI receiving component 199 may also be configured to receive the first packet based on the first state of the multiple bit NDI. Additionally, the example multi-NDI receiving component 199 may be configured to receive a second state of the multiple bit NDI for a second packet, the second state being different than the first state. Further, the example multi-NDI receiving component 199 may be configured to receive the second packet based on the second state of the multiple bit NDI.

Although the following description may be focused on downlink communications, the concepts described herein may be applicable to uplink communications and/or sidelink communications. For example, downlink control information or sidelink control information may comprise a multiple bit NDI. Furthermore, while the following description may be focused on 5G NR, the concepts described herein may be applicable to other similar areas, such as LTE, LTE-A, CDMA, GSM, and other wireless technologies in which signaling of a multi-bit NDI may be beneficial. It may be appreciated that although the following description provides examples in which a base station is in communication with a receiving device, in some examples, the base station may be a receiving device.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
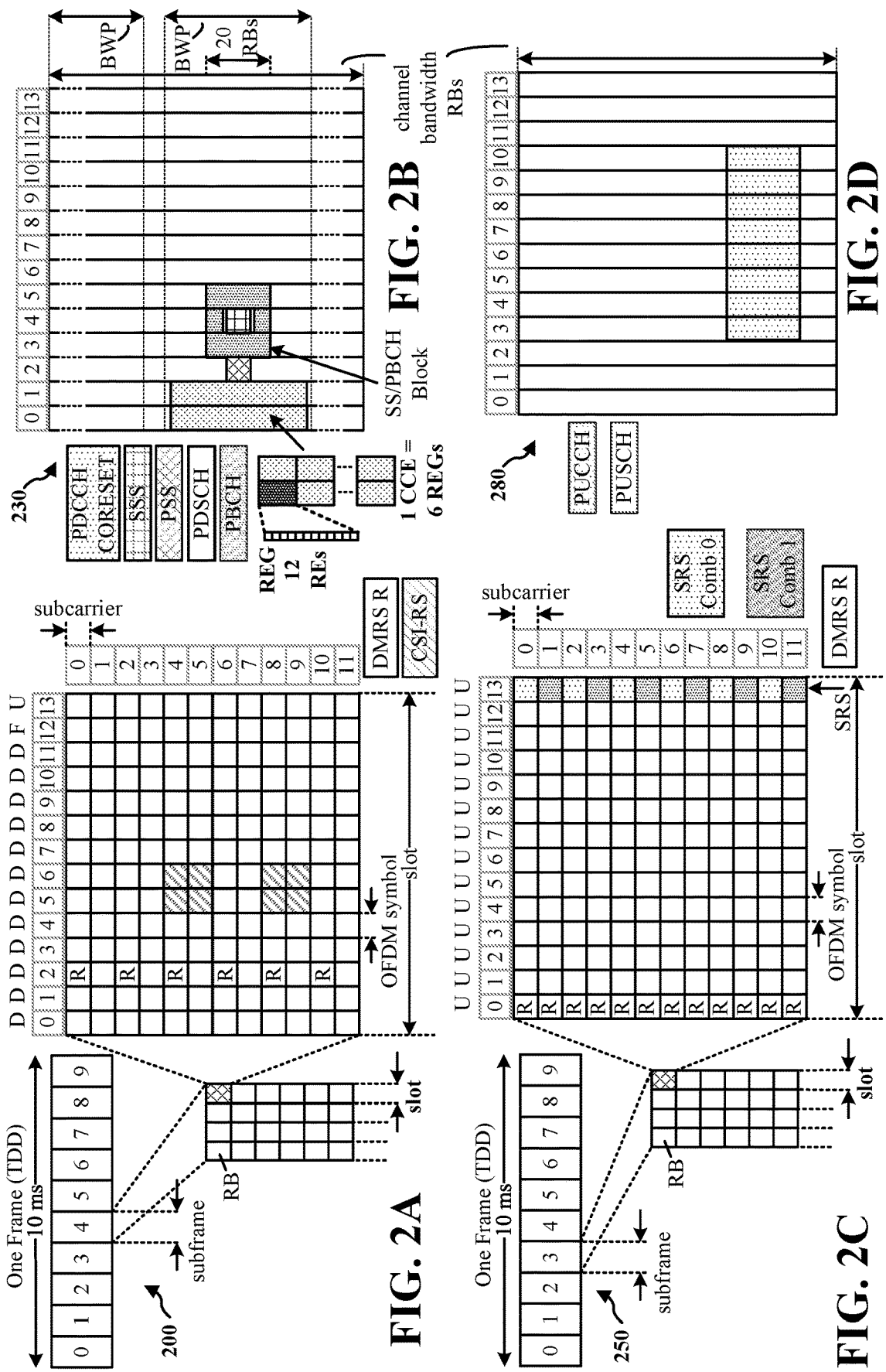
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
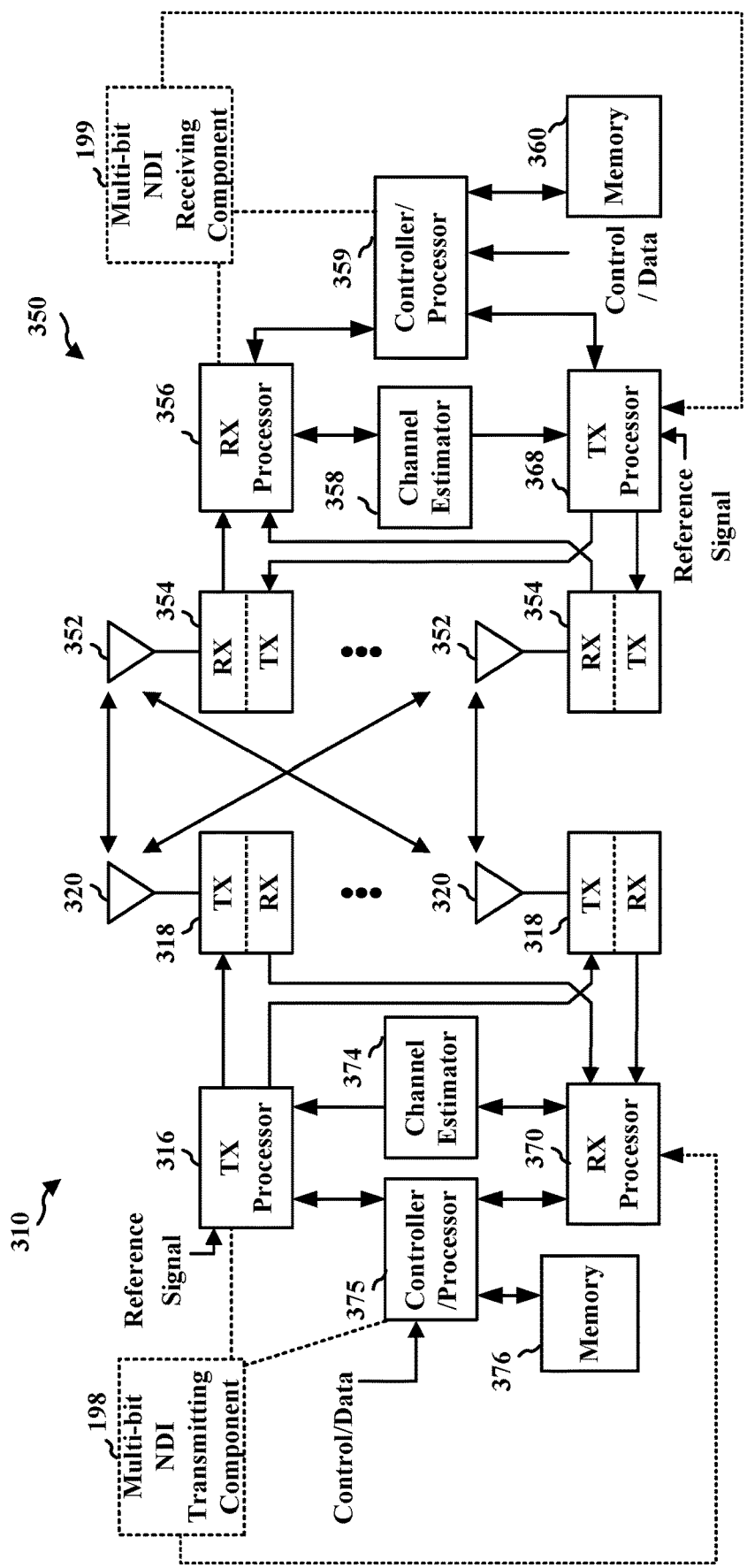
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370)

implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the multi-bit NDI receiving component 199 of FIG. 1.

At least one of the TX processor 316, the RX processor 370, and the controller/processor 375 may be configured to perform aspects in connection with the multi-bit NDI transmitting component 198 of FIG. 1.

Hybrid automatic repeat request (HARQ) feedback refers to a protocol in which a receiver checks for errors in received data and if an error is detected, then the receiver buffers the received data (e.g., in a decoding buffer) and requests a retransmission from a transmitter. The receiver may then be able to combine the buffered data with the retransmitted data prior to performing processing of the data (e.g., performing channeling decoding and/or error detection). The performing of HARQ feedback may facilitate improving the reliability of a data transmission by managing the transmission (and re-transmission) of data from the transmitter to the receiver.

Downlink HARQ refers to the transmitting of downlink data on a downlink data channel (e.g., PDSCH) with HARQ feedback returned on either an uplink control channel (e.g., PUCCH) or an uplink data channel (e.g., PUSCH). In some examples, the transmitter of the downlink data (e.g., a base station) may transmit downlink resource allocations on a downlink control channel (e.g., PDCCH) using downlink control information (DCI). The DCI may include one or more information elements, such as a new data indicator (NDI) and a HARQ attempt number, that may be useful for the performing of downlink HARQ. In some examples, the NDI may be a single bit flag used to indicate to the receiver of the downlink data (e.g., a UE) of whether the transmitter is transmitting a new (e.g., an initial) transmission of a packet or transmitting a retransmission. The transmitter may toggle the value of the NDI relative to a prior transmission to indicate that new data (e.g., a new packet) is being sent rather than a retransmission. The HARQ attempt number may indicate a quantity of HARQ attempts that have been performed for transmitting a packet. For example, when the transmitter transmits a packet, the transmitter may buffer the packet in a transmit buffer until the transmitter receives acknowledgement that the packet was successfully received at the receiver (e.g., via an ACK message) or the transmitter has attempted a maximum quantity of HARQ attempts (e.g., 8 attempts, 16 attempts, etc.). In such examples, the transmitter may clear the transmit buffer after receiving the acknowledgement (e.g., an ACK message) or the maximum quantity of HARQ attempts is reached.

Figure 4:
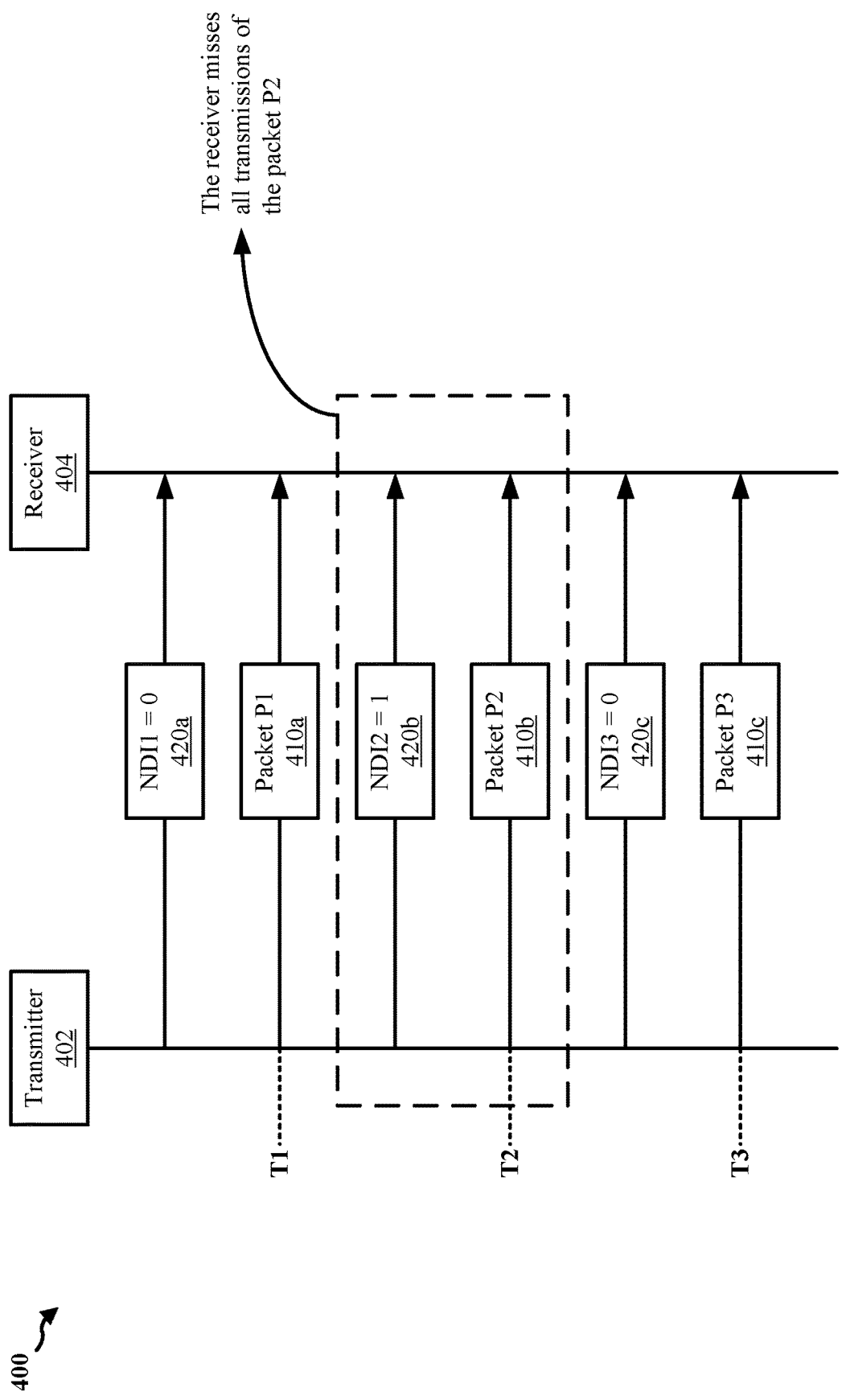
FIG. 4 is a diagram illustrating a sequence of packets transmitted by a base station to a UE.

FIG. 4 illustrates a sequence 400 of packets 410 that may be transmitted by a transmitter 402 to a receiver 404. Aspects of the transmitter 402 may be implemented by a base station, such as the base station 102/180 and/or the base station 310. Aspects of the receiver 404 may be implemented by a UE, such as the UE 104 and/or the UE 350. Although not shown in the example of FIG. 4, it may be appreciated that the receiver 404 may provide HARQ feedback for any of the packets 410.

In the illustrated example of FIG. 4, the transmitter 402 transmits a first packet 410a at a first time T1, transmits a second packet 410b at a second time T2, and transmits a third packet 410c at a third time T3. The transmitter 402 may toggle a value of an NDI associated with a packet when transmitting a new packet. As shown in the illustrated example of FIG. 4, a first NDI 420a associated with the first packet 410a is set to a first value (e.g., the first NDI 420a is set to a "0") indicating that the transmission of the first packet 410a is an initial transmission of the packet. The transmitter 402 then toggles the value of a second NDI 420b associated with the second packet 410b (e.g., the second NDI 420b is set to a "1") when transmitting the second packet 410b indicating that the second packet 410b is a new packet. The transmitter 402 then toggles the value of a third NDI 420c associated with the third packet 410c (e.g., the third NDI 420c is set to a "0"), indicating that the transmission of the third packet 410c is an initial transmission of the packet.

Although shown as separate transmissions in the illustrated example of FIG. 4, it may be appreciated that in additional or alternative examples, the transmissions of a packet and its respective NDI may be transmitted using a single transmission. For example, the transmission of the first packet 410a and the first NDI 420a may occur at the first time T1 using a single transmission.

In some examples, the transmitter 402 may attempt to transmit a packet until a positive acknowledgment (e.g., an ACK message) is received from the receiver 404 or a maximum quantity of HARQ attempts is performed. For example, the maximum quantity of HARQ attempts may be set to eight HARQ attempts. In such examples, a first HARQ attempt may be associated with an initial transmission of a packet, and HARQ attempts 2 to 7 may be associated with retransmissions of the packet.

In some examples, it may be possible for the receiver 404 to not receive all HARQ attempts associated with a packet. For example, in the illustrated example of FIG. 4, the receiver 404 may successfully receive the first packet 410a from the transmitter 402 at the first time T1. The receiver 404 may then miss the initial transmission and the maximum quantity of retransmissions of the second packet 410b. The receiver 404 may then successfully receive the third packet 410c from the transmitter 402 at the time T3. In some such examples, the receiver 404 may transmit a first positive acknowledgement (e.g., an ACK message) to the transmitter 402 indicating that the receiver 404 successfully received the first packet 410a at the time T1 and may transmit another positive acknowledgement (e.g., an ACK message) to the transmitter 402 indicating that the receiver 404 successfully received the third packet 410c at the time T3. However, as the value of the NDIs 420a, 420c associated with the successfully received packets 410a, 410c is the same (e.g., a "0"), the receiver 404 may determine that the third packet 410c is a retransmission of the first packet 410a.

Example techniques disclosed herein provide an NDI that is robust and reliably provides an indication to the receiver that a new packet is being transmitted. For example, disclosed techniques enable a transmitter (e.g., a base station) to transmit a downlink transmission including a multiple bit NDI (e.g., a "multi-bit" NDI). For example, for an NDI having N possible states, the NDI may be an M-bit NDI having states $0, 1, \ldots 2^M-1$. In such examples, the transmitter may rotate through the N states for each new packet.

Furthermore, disclosed techniques enable the multiple bit NDI to include a first portion corresponding to an identifier for a new packet and a second portion corresponding to a HARQ transmission index. For example, the first portion of the multiple bit NDI may be M-bits that enable the value of the NDI to rotate (e.g., cycle or traverse) between N possible states (e.g., states $0, 1, \ldots 2^M-1$). The second portion of the multiple bit NDI may correspond to the HARQ transmission index for the respective packet. For example, if the maximum quantity of HARQ attempts is set to eight HARQ attempts, the HARQ transmission index may range from zero to seven, where HARQ transmission index of zero represents an initial transmission of a packet and HARQ transmission indexes one to seven represent respective retransmissions of the respective packet.

In some examples, a length of the multiple bit NDI may be based on the quantity of bits to facilitate implementing the N states of the first portion and the quantity of bits to facilitate indicating the maximum quantity of HARQ attempts of the second portion. For example, in the above example, the N possible states of the first portion may be represented by M-bits and the eight maximum quantity of HARQ attempts may be represented by three bits. In such examples, the length of the multi-bit NDI may be M+3 bits.

In some examples, the transmitter may include a flush indicator in a transmission to indicate to the receiver whether the receiver is to combine the data of the instant transmission with buffered data received in a prior transmission or to "flush" (or discard) the buffered data. For example, the transmitter may set the flush indicator to a first value (e.g., a "1") to indicate to the receiver to forego the combining of the data of the instant transmission with buffered data received in a prior transmission (e.g., to "flush" the buffered data). The transmitter may set the flush indicator to a second value (e.g., a "0") to indicate to the receiver to combine the data of the instant transmission with buffered data received in a prior transmission. In some examples, the transmitter may set the flush indicator to the first value (e.g., a "1") to indicate to the receiver to "flush" the buffered data for every initial HARQ attempt of a new packet.

Figure 5:
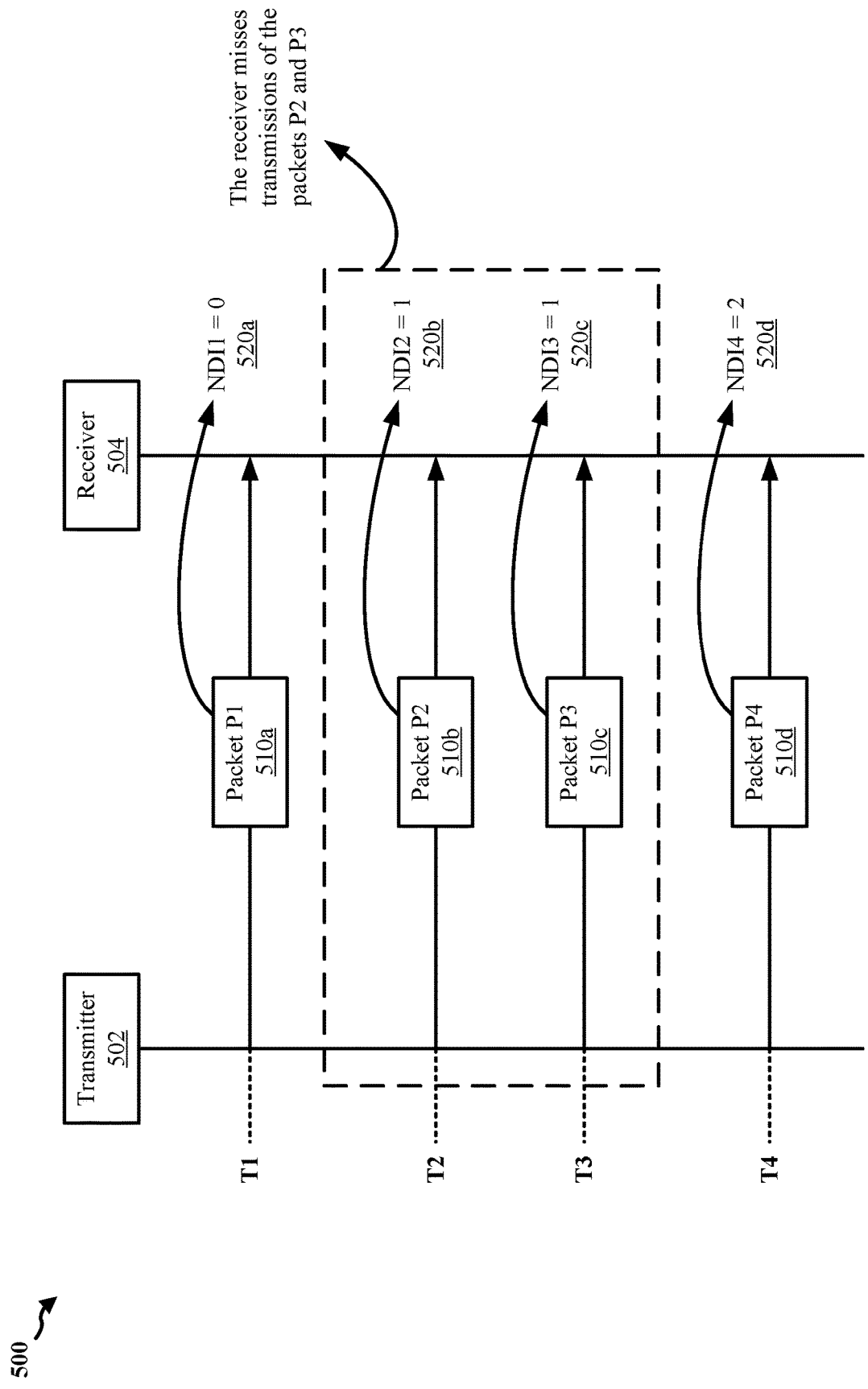
FIG. 5 is a diagram illustrating a sequence of packets transmitted by a base station to a UE, in accordance with one or more techniques disclosed herein.

FIG. 5 illustrates a sequence 500 of packets 510a-510d that may be transmitted by a transmitter 502 to a receiver 504, in accordance with one or more techniques disclosed herein. Aspects of the transmitter 502 may be implemented by a base station or a transmitter, such as the base station 102/180, the base station 310, and/or the transmitter 402. Aspects of the receiver 504 may be implemented by a UE or a receiver, such as the UE 104, the UE 350, and/or the receiver 404. Although not shown in the example of FIG. 5, it may be appreciated that the receiver 504 may provide HARQ feedback for any of the packets 510a-510d.

In the illustrated example of FIG. 5, the transmitter 502 transmits a first packet 510a at a first time T1, transmits a second packet 510b at a second time T2, transmits a third packet 510c at a third time T3, and transmits a fourth packet 510d at a fourth time T4. The transmitter 502 also transmits a multiple bit NDI that is associated with each of the respective packets 510a-510d. In the illustrated example, the multiple bit NDI provides more than two different states for indicating a new packet. For example, an M-bit NDI may indicate N different states, where N may range from states 0, 1, . . . $2^M-1$.

In the illustrated example of FIG. 5, the transmitter 502 may increase the state of the multiple bit NDI by one for each new packet. For example, a first NIDI 520a associated with the first packet 510a is set to a first value (e.g., the first NDI 520a is set to a state "0"). The second packet 510b is a new packet (e.g., an initial transmission) and the transmitter 502 increases the state of a second NDI 520b associated with the second packet 510b to a second value (e.g., the second NDI 520b is set to a state "1"). The third packet 510c is a retransmission (e.g., of the data transmitted at the time T2) and the transmitter 502 maintains (e.g. does not increase) the state of a third NDI 520c associated with the third packet 510c (e.g., the third NDI 520c is set to the state "1"). The fourth packet 510d is a new packet (e.g., an initial transmission) and the transmitter 502 increases the state of a fourth NDI 520d associated with the fourth packet 510d by one (e.g., the fourth NDI 520d is set to a state "2").

As shown in the illustrated example of FIG. 5, the transmitter 502 increases the state of an NDI associated with a packet transmission when the packet is a new packet. For example, the state of the NDIs 520a, 520b, 520d associated with the packet transmissions of the packets 510a, 510b, 510d at the times T1, T2, and T4, respectively, is increased by a value of one. Additionally, the transmitter 502 maintains (e.g., does not change) the value of the state of an NDI associated with a packet transmission when the packet is a retransmission. For example, the state of the third NDI 520c associated with the third packet 510c is the same as the second NDI 520b associated with the second packet 510b (e.g., a state "1").

By employing a multiple bit NDI that is capable of indicating more than two different states, the receiver 504 may be able to identify if a packet is missed. For example, the receiver 504 may not receive all HARQ attempts associated with a packet (e.g., the transmissions associated with the second packet 510b and the third packet 510c). For example, in the illustrated example of FIG. 5, the receiver 504 may successfully receive the first packet 510a from the transmitter 502 at the first time T1. The receiver 504 may then miss the initial transmission of a new packet at the second time T2 (e.g., the second packet 510b) and the maximum quantity of retransmissions of the packet at the third time T3 (e.g., the third packet 510c). The receiver 504 may then successfully receive the fourth packet 510d from the transmitter 502 at the fourth time T4. In some such examples, the receiver 504 may transmit a first positive acknowledgement (e.g., an ACK message) to the transmitter 502 indicating that the receiver 504 successfully received the first packet 510a at the time T1 and may transmit another positive acknowledgement (e.g., an ACK message) to the transmitter 502 indicating that the receiver 504 successfully received the fourth packet 510d at the fourth time T4. However, as the value of the first NDI 520a associated with the successfully received packet 510a and the value of the fourth NDI 520d associated with the successfully received packet 510d is different, the receiver 504 may determine that a packet was missed (e.g., the packet associated with the second packet 510b and the third packet 510c).

Thus, it may be appreciated that by employing the multi-bit NDI disclosed herein, in order for the receiver 504 to incorrectly attribute a packet as a retransmission of a prior packet (as shown in the illustrated example of FIG. 4), the quantity of missed packets may increase. For example, in the example of FIG. 4, by missing all HARQ attempts of one packet (e.g., the second packet 410b), the receiver may incorrectly attribute the third packet 410c as a retransmission of the first packet 410a. However, in the illustrated example of FIG. 5, the receiver 504 would need to miss all HARQ attempts for N-1 packets before incorrectly attributing the fourth packet 510d as a retransmission of the first packet 510a.

Figure 6:
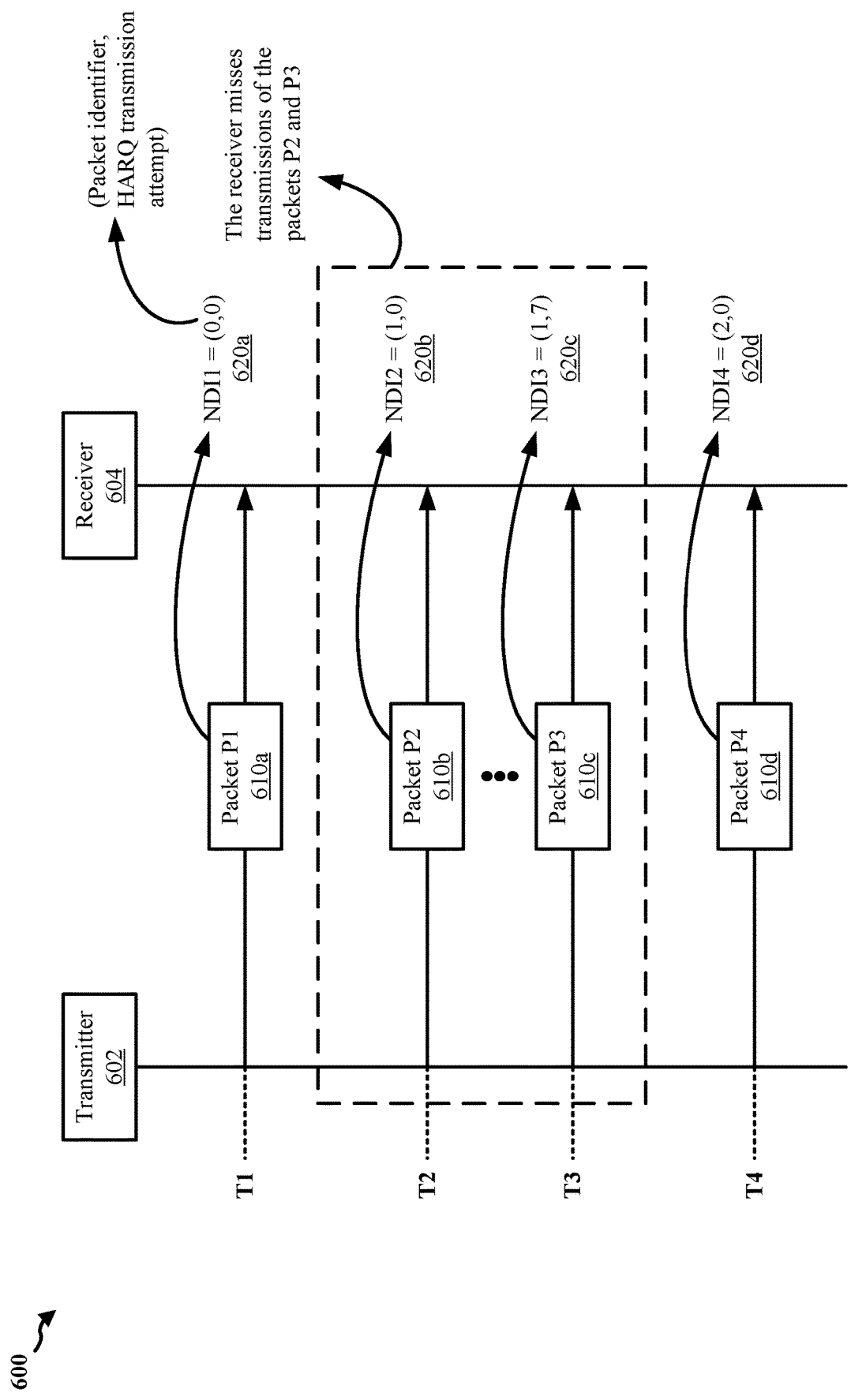
FIG. 6 is a diagram illustrating a sequence of packets transmitted by a base station to a UE, in accordance with one or more techniques disclosed herein.

FIG. 6 illustrates a sequence 600 of packets 610a-610d that may be transmitted by a transmitter 602 to a receiver 604, in accordance with one or more techniques disclosed herein. Aspects of the transmitter 602 may be implemented by a base station or a transmitter, such as the base station 102/180, the base station 310, the transmitter 402, and/or the transmitter 502. Aspects of the receiver 604 may be implemented by a UE or a receiver, such as the UE 104, the UE 350, the receiver 404, and/or the receiver 504. Although not shown in the example of FIG. 6, it may be appreciated that the receiver 604 may provide HARQ feedback for any of the packets 610a-610d.

In the illustrated example of FIG. 6, the transmitter 602 transmits a first packet 610a at a first time T1, transmits a second packet 610b at a second time T2, transmits a third packet 610c at a third time T3, and transmits a fourth packet 610d at a fourth time T4. In the illustrated example, the transmissions of the first packet 610a, the second packet 610b, and the fourth packet 610d are initial transmissions of new packets. The transmission of the third packet 610c is a retransmission (e.g., of the second packet 610b).

The transmitter 602 also transmits a multiple bit NDI 620a-620d that is associated with each of the respective packets 610a-610d. In the illustrated example of FIG. 6, the multi-bit NDIs 620a, 620b, 620c, 620d include a combination of a first set of bits and a second set of bits. For example, the first set of bits may indicate a new packet and the second set of bits may indicate a HARQ transmission index. For example, the first set of bits may be M-bits and indicate N different states, where N may range from states 0, 1, . . . $2^M-1$. The second set of bits may indicate a HARQ attempt number associated with the packet transmission.

As shown in the example of FIG. 6, the multi-bit NDI may be expressed as two values (a, b), where the value "a" represents the packet (e.g., a packet identifier), and the value "b" represents the HARQ transmission index. For example, the first packet 610a, the second packet 610b, and the fourth packet 610d are new packets and the state of the first value "a" increases for each of the respective packets 610a, 610b, 610d. Additionally, the HARQ transmission index indicated by the second value "b" is set to "0," as the first packet 610a, the second packet 610b, and the fourth packet 610d are new packets.

Additionally, and as shown in FIG. 6, the third packet 610c is a retransmission. In such examples, the state of the first value "a" is the same as the previous new packet (e.g., is set to "1"). The HARQ transmission index indicated by the second value "b" is set to "7" and indicates that the third packet 610c is an eighth HARQ attempt. Thus, it may be appreciated that packets transmitted between the second time T2 and the third time T3 (e.g., including the initial transmission of the second packet 610b at the time T2 and the third packet 610c at the time T3) have the same state of the first value "a" (e.g., set to "1") and the HARQ transmission index of the second value "b" increases from "0" to "7."

In the illustrated example of FIG. 6, the length of the NDI may be based on the quantity of bits to indicate the packet (e.g., M-bits) and the quantity of bits to indicate the HARQ transmission index.

Figure 7:
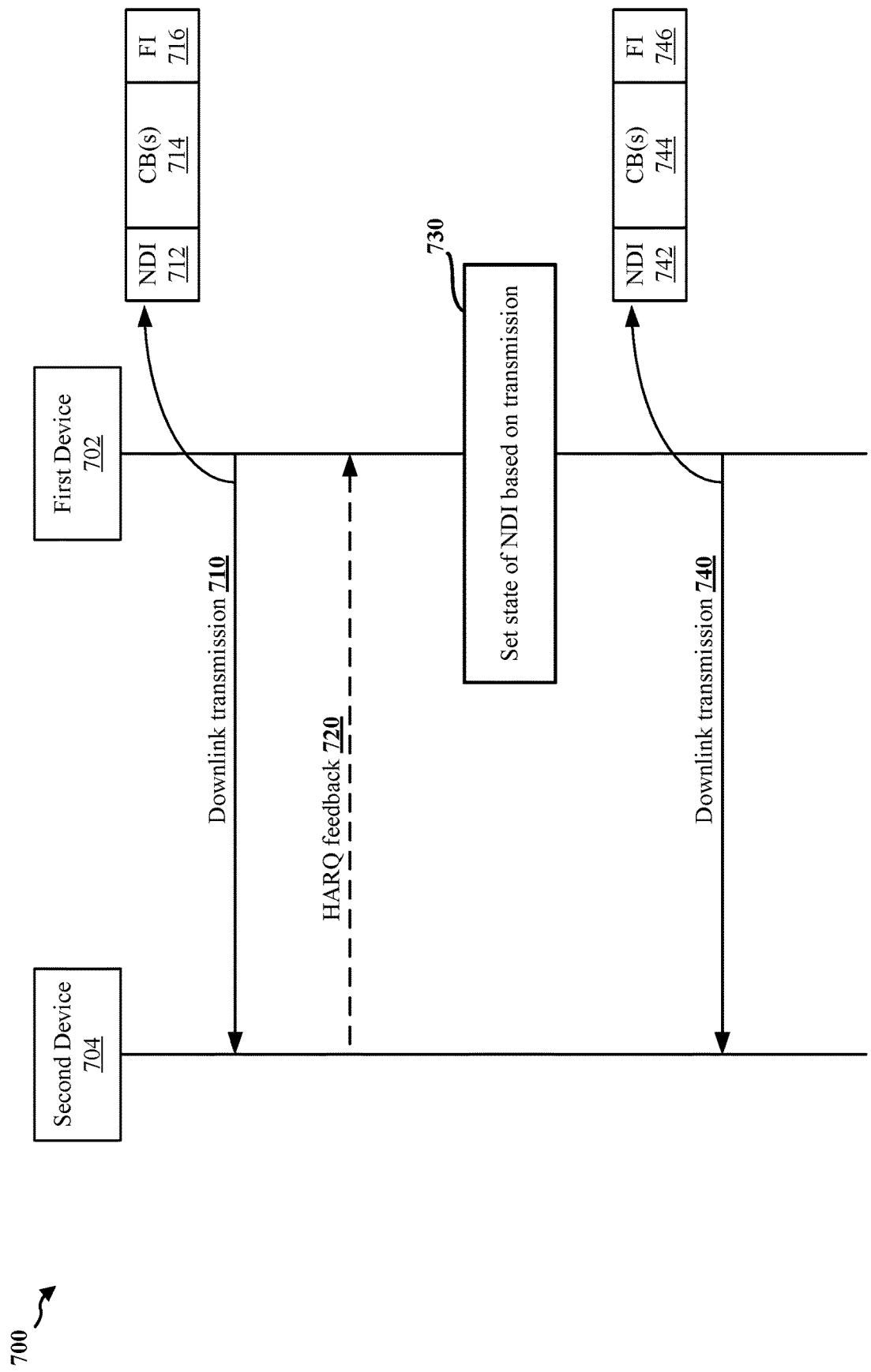
FIG. 7 is an example communication flow between a base station and a UE, in accordance with one or more techniques disclosed herein.

FIG. 7 illustrates an example communication flow 700 between a first device 702 and a second device 704, in accordance with one or more techniques disclosed herein. Aspects of the first 702 may be implemented by a base station or a transmitter, such as the base station 102, the base station 180, the base station 310, the transmitter 402, the transmitter 502, and/or the transmitter 602. Aspects of the second device 704 may be implemented by a UE or a receiver, such as the UE 104, the UE 350, the receiver 404, the receiver 504, and/or the receiver 604. In the illustrated example of FIG. 7, the first device 702 is in communication with the second device 704. Although not shown in the illustrated example of FIG. 7, it may be appreciated that in additional or alternative examples, the first device 702 may be in communication with one or more other base stations or UEs, and/or the second device 704 may be in communication with one or more other base stations or UEs.

In the illustrated example, the first device 702 transmits a first downlink transmission 710 that is received by the second device 704. The first downlink transmission 710 may include a multiple bit NDI 712 and one or more code blocks 714. In some examples, the first downlink transmission 710 may also include a flush indicator 716 to indicate to the second device 704 whether to combine the one or more code blocks 714 of the first downlink transmission 710 with prior transmissions or to not combine the one or more code blocks 714 of the first downlink transmission 710 with prior transmissions. The one or more code blocks 714 may be implemented by the packets 510a-510d of FIG. 5 and/or the packets 610a-610d of FIG. 6.

The multiple bit NDI 712 may include M-bits and provide (e.g., may represent) more than two states. For example, the multiple bit NDI 712 may indicate N states, where N may range from states 0, 1, . . . $2^M-1$. In some examples, the multiple bit NDI 712 may be implemented by the NDIs 520a-520d of FIG. 5. In some examples, the multiple bit NDI 712 may be implemented by the NDIs 620a-620d of FIG. 6. The first device 702 may transmit the multiple bit NDI 712 via DCI.

The second device 704 may transmit HARQ feedback 720 to the first device 702 based on the first downlink transmission 710. For example, the second device 704 may process the code blocks 714 of the first downlink transmission 710 and the HARQ feedback 720 may indicate to the first device 702 when an error is detected in the one or more code blocks 714 (e.g., by transmitting a NACK message) or when the code blocks 714 are successfully received (e.g., by transmitting an ACK message).

The first device 702 transmits a second downlink transmission 740 that may be received by the second device 704. In some examples, the second downlink transmission 740 may be an initial transmission of a new packet (e.g., the packets 510a, 510b, 510d, 610a, 610b, 610d). In some examples, the second downlink transmission 740 may be a retransmission of a prior packet (e.g., the packets 510c, 610c). The second downlink transmission 740 includes a multiple bit NDI 742 and one or more code blocks 744. Aspects of the multiple bit NDI 742 may similar to the multiple bit NDI 712. Aspects of the one or more code blocks 744 may be similar to the one or more code blocks 714.

In some examples, the second downlink transmission 740 may also include a flush indicator 746 to indicate to the second device 704 whether to combine the one or more code blocks 744 of the second downlink transmission 740 with prior transmissions or to not combine the one or more code blocks 744 of the second downlink transmission 740 with prior transmissions. For example, the flush indicator 746 may be set to a first value to indicate to the second device 704 to combine the one or more code blocks 744 with the code block(s) of a prior transmission (e.g., the one or more code blocks 714 of the first downlink transmission 710). The flush indicator 746 may be set to a second value to indicate to the second device 704 to forego combining the one or more code blocks 744 with the code block(s) of a prior transmission.

In the illustrated example of FIG. 7, the first device 702 sets, at 730, the state of the multiple bit NDI 742 for the second downlink transmission 740. For example, the first device 702 may rotate the state of the multiple bit NDI 742 to indicate different packets. For example, when the second downlink transmission 740 is an initial transmission of a packet, the first device 702 may increase the state of the multiple bit NDI 742. When the second downlink transmission 740 is a retransmission of a packet, the first device 702 may maintain (e.g., not change) the state of the multiple bit NDI 742.

Although the example of FIG. 7 describes the first device 702 as a base station and the second device 704 as a UE and, thus, transmissions from the first device 702 to the second device 704 as downlink transmissions 710, 740, in other examples, the first device and the second device may comprise UEs and, thus, transmissions from the first device 702 to the second device 704 may be sidelink transmissions. In such examples, the first device 702 may transmit the multiple bit NDI using sidelink control information. Additionally, in some examples, the first device may comprise a UE and the second device may comprise a base station and, thus, transmissions from the first device 702 to the second device 704 may be uplink transmissions. In such examples, the first device 702 may transmit the multiple bit NDI using uplink control information.

Figure 8:
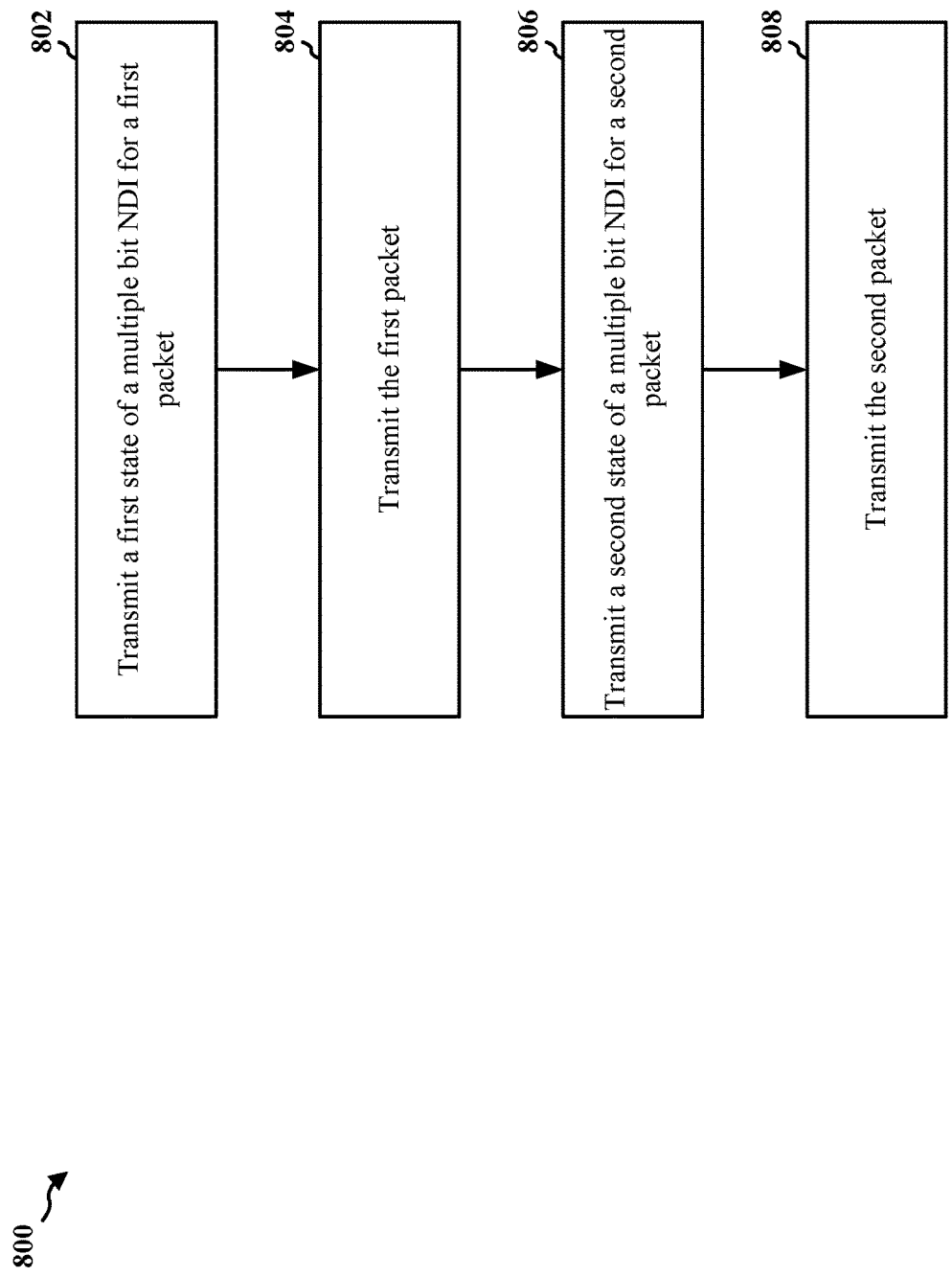
FIG. 8 is a flowchart of a method of wireless communication at a first device, in accordance with the teachings disclosed herein.

FIG. 8 is a flowchart 800 of a method of wireless communication at a first device. In some examples, the method may be performed by a base station (e.g., the base station 102/180, the base station 310, and/or an apparatus 1002 of FIG. 10). In some examples, the first device may comprise a UE (e.g., the UE 104 and/or the UE 350). The UE may transmit communication to a base station, in some examples. In other examples, the UE may transmit communication to another UE. The method may facilitate improving communication by reducing ambiguity at a second device of whether a transmission corresponds to an initial transmission of a packet or a retransmission of the packet.

At 802, the first device transmits a first state of a multiple bit NDI for a first packet, as described in connection with the multiple bit NDI 712 of FIG. 7. For example, 802 may be performed by an NDI transmission component 1040 of the apparatus 1002 of FIG. 10. The multiple bit NDI may be configured to indicate more than two different states for indicating a new packet. The multiple bit NDI may indicate a HARQ transmission attempt, as described in connection with the second value "b" of the multiple NDIs 620a-620d of FIG. 6. For example, the multiple NDI may include a combination of a first set of bits (e.g., a first value "a") and a second set of bits (e.g., a second value "b"). The first set of bits may indicate a packet and the second set of bits may indicate the HARQ transmission attempt.

In some examples, the first device may transmit the multiple bit NDI in downlink control information. In other examples, the first device may transmit the multiple bit NDI in sidelink control information. In other examples, the first device may transmit the multiple bit NDI in uplink control information.

At 804, the first device transmits the first packet, as described in connection with the first downlink transmission 710 of FIG. 7. For example, 804 may be performed by a packet transmission component 1042 of the apparatus 1002 of FIG. 10. The first packet may include one or more code blocks. The first packet may be an initial transmission (e.g., rather than a retransmission).

At 806, the first device transmits a second state of a multiple bit NDI for a second packet, as described in connection with the multiple bit NDI 742 of FIG. 7. For example, 806 may be performed by the NDI transmission component 1040 of the apparatus 1002 of FIG. 10. The second state may be different than the first state, as described in connection with, for example, the second NDI 520b and the first NDI 520a of FIG. 5 and/or the second NDI 620b and the first NDI 620a of FIG. 6. The first device may transmit the multiple bit NDI in downlink control information, sidelink control information, and/or uplink control information.

At 808, the first device transmits the second packet, as described in connection with the second downlink transmission 740 of FIG. 7. For example, 808 may be performed by the packet transmission component 1042 of the apparatus 1002 of FIG. 10.

Figure 9:
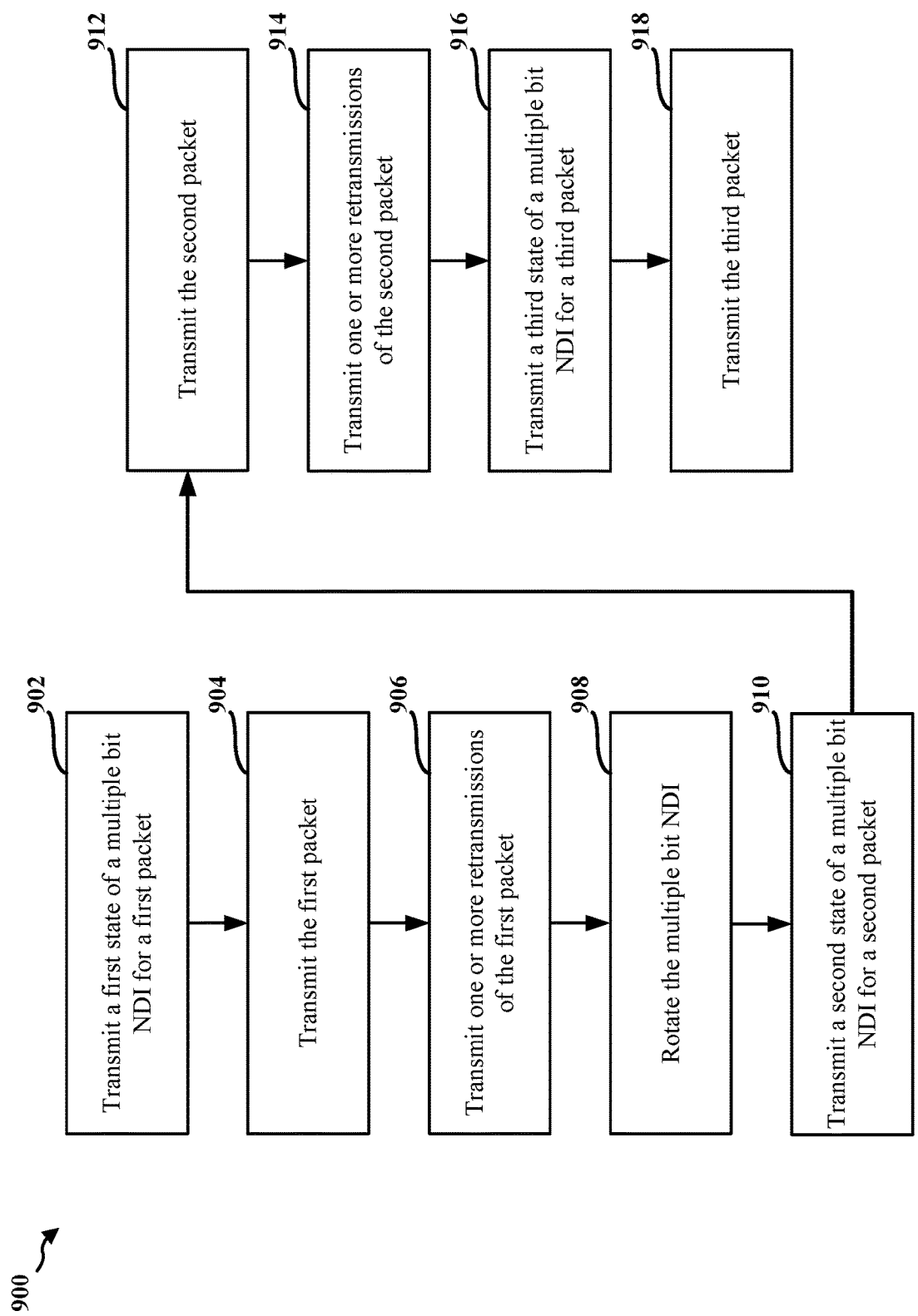
FIG. 9 is a flowchart of a method of wireless communication at a first device, in accordance with the teachings disclosed herein.

FIG. 9 is a flowchart 900 of a method of wireless communication at a first device. In some examples, the method may be performed by a base station (e.g., the base station 102/180, the base station 310, and/or an apparatus 1002 of FIG. 10). In some examples, the first device may comprise a UE (e.g., the UE 104 and/or the UE 350). The UE may transmit communication to a base station, in some examples. In other examples, the UE may transmit communication to another UE. The method may facilitate improving communication by reducing ambiguity at a second device of whether a transmission corresponds to an initial transmission of a packet or a retransmission of the packet.

At 902, the first device transmits a first state of a multiple bit NDI for a first packet, as described in connection with the multiple bit NDI 712 of FIG. 7. For example, 902 may be performed by an NDI transmission component 1040 of the apparatus 1002 of FIG. 10. The multiple bit NDI may be configured to indicate more than two different states for indicating a new packet. The multiple bit NDI may indicate a HARQ transmission attempt, as described in connection with the second value "b" of the multiple NDIs 620a-620d of FIG. 6. For example, the multiple NDI may include a combination of a first set of bits (e.g., a first value "a") and a second set of bits (e.g., a second value "b"). The first set of bits may indicate a packet and the second set of bits may indicate the HARQ transmission attempt.

In some examples, the first device may transmit the multiple bit NDI in downlink control information. In other examples, the first device may transmit the multiple bit NDI in sidelink control information. In other examples, the first device may transmit the multiple bit NDI in uplink control information.

At 904, the first device transmits the first packet, as described in connection with the first downlink transmission 710 of FIG. 7. For example, 904 may be performed by a packet transmission component 1042 of the apparatus 1002 of FIG. 10. The first packet may include one or more code blocks. The first packet may be an initial transmission (e.g., rather than a retransmission).

As illustrated at 906, the first device may transmit one or more retransmissions of the first packet, as described in connection with the third packet 510c of FIG. 5 and/or the third packet 610c of FIG. 6. For example, 906 may be performed by a retransmission component 1046 of the apparatus 1002 of FIG. 10.

At 910, the first device transmits a second state of a multiple bit NDI for a second packet, as described in connection with the multiple bit NDI 742 of FIG. 7. For example, 910 may be performed by the NDI transmission component 1040 of the apparatus 1002 of FIG. 10. The second state may be different than the first state, as described in connection with, for example, the second NDI 520b and the first NDI 520a of FIG. 5 and/or the second NDI 620b and the first NDI 620a of FIG. 6. The first device may transmit the multiple bit NDI in downlink control information, sidelink control information, and/or uplink control information.

At 912, the first device transmits the second packet, as described in connection with the second downlink transmission 740 of FIG. 7. For example, 912 may be performed by the packet transmission component 1042 of the apparatus 1002 of FIG. 10.

In some examples, the first packet and the second packet may comprise initial transmissions (e.g., rather than transmissions), as described in connection with the example first packet 510a and the second packet 510b of FIG. 5 and/or the first packet 610a and the second packet 610b of FIG. 6. In such examples, the first device may, at 908, rotate the multiple bit NDI through the more than two different states to indicate different packets, as described in connection with the second NDI 520b of FIG. 5 and/or the second NDI 620b of FIG. 6. For example, 908 may be performed by a rotation component 1044 of the apparatus 1002 of FIG. 10. The first device may rotate the NDI used to indicate new packets and the first device may use the multiple bit NDI to indicate more than two packets.

In some examples, the second packet, as transmitted at 912, may be a retransmission of the first packet, as described in connection with the third packet 510c of FIG. 5 and/or the third packet 610c of FIG. 6. In some examples, the multiple bit NDI may indicate a HARQ transmission attempt, as described in connection with the second value "b" of the multiple NDIs 620a-620d of FIG. 6. For example, the multiple NDI may include a combination of a first set of bits (e.g., a first value "a") and a second set of bits (e.g., a second value "b"). The first set of bits may indicate a packet and the second set of bits may indicate the HARQ transmission attempt.

As illustrated at 914, the first device may transmit one or more retransmissions of the second packet, as described in connection with the third packet 510c of FIG. 5 and/or the third packet 610c of FIG. 6. For example, 914 may be performed by a retransmission component 1046 of the apparatus 1002 of FIG. 10.

Whereas a single bit NDI may be limited to two states, as illustrated at 916, the first device may transmit a third state of the multiple bit NDI for a third packet, as described in connection in with the fourth NDI 520d of FIG. 5 and/or the fourth NDI 620d of FIG. 6. For example, 916 may be performed by the NDI transmission component 1040 of the apparatus 1002 of FIG. 10. The third state of the multiple bit NDI may be different than the first state and the second state.

At 918, the first device may transmit the third packet, as described in connection with the fourth packet 510d of FIG. 5 and/or the fourth packet 610d of FIG. 6. For example, 918 may be performed by the packet transmission component 1042 of the apparatus 1002 of FIG. 10. In some examples, the third packet may be an initial packet. In other examples, the third packet may be a retransmission.

Figure 10:
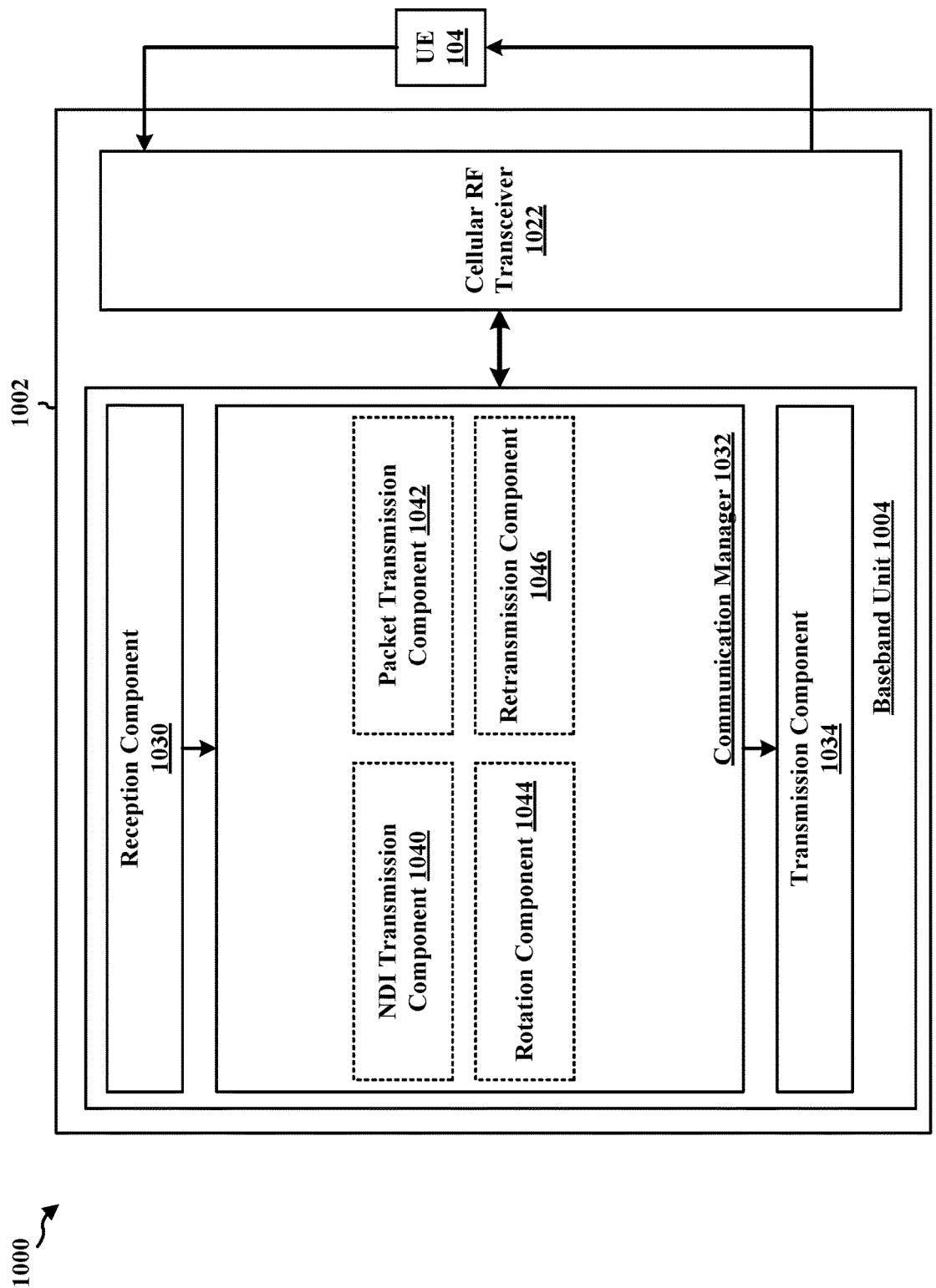
FIG. 10 is a diagram illustrating an example of a hardware implementation for an example apparatus, in accordance with the teachings disclosed herein.

FIG. 10 is a diagram 1000 illustrating an example of a hardware implementation for an apparatus 1002. The apparatus 1002 is a base station and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes an NDI transmission component 1040 that is configured to transmit a first state of a multiple bit NDI for a first packet, the multiple bit NDI indicating more than two different states for indicating a new packet, for example, as described in connection with 802 of FIG. 8 and/or 902 of FIG. 9. The example NDI transmission component 1040 may be further configured to transmit a second state of the multiple bit NDI for a second packet, the second state being different than the first state, for example, as described in connection with 806 of FIG. 8 and/or 910 of FIG. 9. The example NDI transmission component 1040 may be further configured to transmit a third state of the multiple bit NDI for a third packet, the third state being different than the first state and the second state, for example, as described in connection with 916 of FIG. 9.

The communication manager 1032 also includes a packet transmission component 1042 that is configured to transmit the first packet, for example, as described in connection with 804 of FIG. 8 and/or 904 of FIG. 9. The example packet transmission component 1042 may be further configured to transmit the second packet, for example, as described in connection with 808 of FIG. 8 and/or 912 of FIG. 9. The example packet transmission component 1042 may be further configured to transmit the third packet, for example, as described in connection with 918 of FIG. 9.

The communication manager 1032 also includes a rotation component 1044 that is configured to rotate the multiple bit NDI through the more than two different states to indicate different packets, for example, as described in connection with 908 of FIG. 9.

The communication manager 1032 also includes a retransmission component 1046 that is configured to transmit one or more retransmissions of the first packet, for example, as described in connection with 906 of FIG. 9. The example retransmission component 1046 may be further configured to transmit one or more retransmissions of the second packet, for example, as described in connection with 914 of FIG. 9.

The apparatus may include additional components that perform each of the blocks of the algorithm in the aforementioned flowcharts of FIGS. 8 and/or 9. As such, each block in the aforementioned flowcharts of FIGS. 8 and/or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for transmitting a first state of a multiple bit an NDI for a first packet. The example apparatus 1002 also includes means for transmitting the first packet. The example apparatus 1002 also includes means for transmitting a second state of the multiple bit NDI for a second packet. The example apparatus 1002 also includes means for transmitting the second packet.

In another configuration, the example apparatus 1002 also includes means for transmitting a third state of the multiple bit NDI for a third packet. The example apparatus 1002 also includes means for transmitting the third packet.

In another configuration, the example apparatus 1002 also includes means for transmitting one or more retransmissions of at least the first packet or the second packet.

In another configuration, the apparatus 1002, and in particular the cellular baseband processor 1004, includes means for transmitting a first state of a multiple bit NDI for a first packet, the multiple bit NDI indicating more than two different states for indicating a new packet. The example apparatus 1002 also includes means for transmitting the first packet. The example apparatus 1002 also includes means for transmitting a second state of the multiple bit NDI for a second packet, the second state being different than the first state. The example apparatus 1002 also includes means for transmitting the second packet.

In another configuration, the example apparatus 1002 also includes means for rotating the multiple bit NDI through the more than two different states to indicate different packets.

In another configuration, the example apparatus 1002 also includes means for transmitting a third state of the multiple bit NDI for a third packet, the third state being different than the first state and the second state. The example apparatus 1002 also includes means for transmitting the third packet.

In another configuration, the example apparatus 1002 also includes means for transmitting the multiple bit NDI in downlink control information or sidelink control information that comprises the multiple bit NDI.

In another configuration, the example apparatus 1002 also includes means for transmitting one or more retransmissions of at least the first packet or the second packet.

The aforementioned means may be one or more of the aforementioned components of the apparatus 1002 configured to perform the functions recited by the aforementioned means. As described supra, the apparatus 1002 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 11:
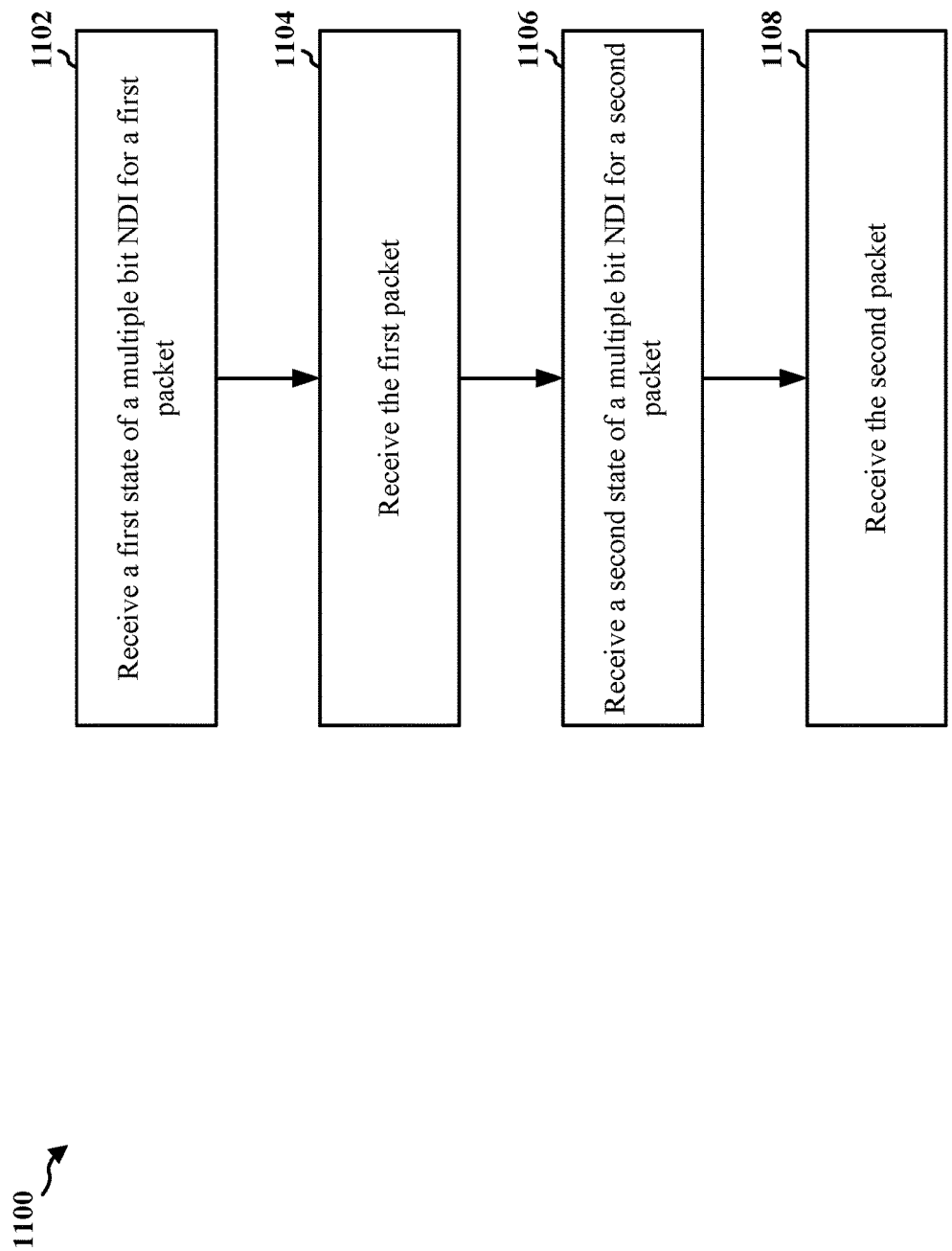
FIG. 11 is a flowchart of a method of wireless communication at a second device, in accordance with the teachings disclosed herein.

FIG. 11 is a flowchart 1100 of a method of wireless communication, with a first device, at a second device. In some examples, the second device may comprise a receiver or a UE (e.g., the UE 104, the UE 350, and/or an apparatus 1302 of FIG. 13). The UE may receive communication from a base station, in some examples. In other examples, the UE may receive communication from another UE. In some examples, the method may be performed by a base station. The method may facilitate improving communication by reducing ambiguity at the second device of whether a transmission corresponds to an initial transmission of a packet or a retransmission of the packet.

At 1102, the second device receives a first state of a multiple bit NDI for a first packet, as described in connection with the multiple bit NDI 712 of FIG. 7. For example, 1102 may be performed by an NDI reception component 1340 of the apparatus 1302 of FIG. 13. The multiple bit NDI may be configured to indicate more than two different states for indicating a new packet. The multiple bit NDI may rotate through the different states to indicate different packets. The multiple bit NDI may indicate a HARQ transmission attempt, as described in connection with the second value "b" of the multiple NDIs 620a-620d of FIG. 6. For example, the multiple NDI may include a combination of a first set of bits (e.g., a first value "a") and a second set of bits (e.g., a second value "b"). The first set of bits may indicate a packet and the second set of bits may indicate the HARQ transmission attempt.

In some examples, the second device may receive the multiple bit NDI in downlink control information. In other examples, the second device may receive the multiple bit NDI in sidelink control information. In other examples, the second device may receive the multiple bit NDI in uplink control information.

At 1104, the second device receives the first packet, for example, based on the state of the NDI, as described in connection with the first downlink transmission 710 of FIG. 7. For example, 1104 may be performed by a packet reception component 1342 of the apparatus 1302 of FIG. 13. The first packet may include one or more code blocks. The first packet may be an initial transmission (e.g., rather than a retransmission).

At 1106, the second device receives a second state of the multiple bit NDI for a second packet, as described in connection with the multiple bit NDI 742 of FIG. 7. For example, 1106 may be performed by the NDI reception component 1340 of the apparatus 1302 of FIG. 13. The second state may be different than the first state, as described in connection with, for example, the second NDI 520b and the first NDI 520a of FIG. 5 and/or the second NDI 620b and the first NDI 620a of FIG. 6. The second device may receive the multiple bit NDI in downlink control information, sidelink control information, and/or uplink control information At 1108, the second device receives the second packet, for example, based on the second state of the NDI, as described in connection with the second downlink transmission 740 of FIG. 7. For example, 1108 may be performed by the packet reception component 1342 of the apparatus 1302 of FIG. 13.

In some examples, the first packet and the second packet may comprise initial transmissions (e.g., rather than transmissions), as described in connection with the example first packet 510a and the second packet 510b of FIG. 5 and/or the first packet 610a and the second packet 610b of FIG. 6. In such examples, the multiple bit NDI may be rotated through the more than two different states to indicate different packets, as described in connection with the second NDI 520b of FIG. 5 and/or the second NDI 620b of FIG. 6.

In some examples, the second packet, as received at 1108, may be a retransmission of the first packet, as described in connection with the third packet 510c of FIG. 5 and/or the third packet 610c of FIG. 6. In some examples, the multiple bit NDI may indicate a HARQ transmission attempt, as described in connection with the second value "b" of the multiple NDIs 620a-620d of FIG. 6. For example, the multiple NDI may include a combination of a first set of bits (e.g., a first value "a") and a second set of bits (e.g., a second value "b"). The first set of bits may indicate a packet and the second set of bits may indicate the HARQ transmission attempt.

Figure 12:
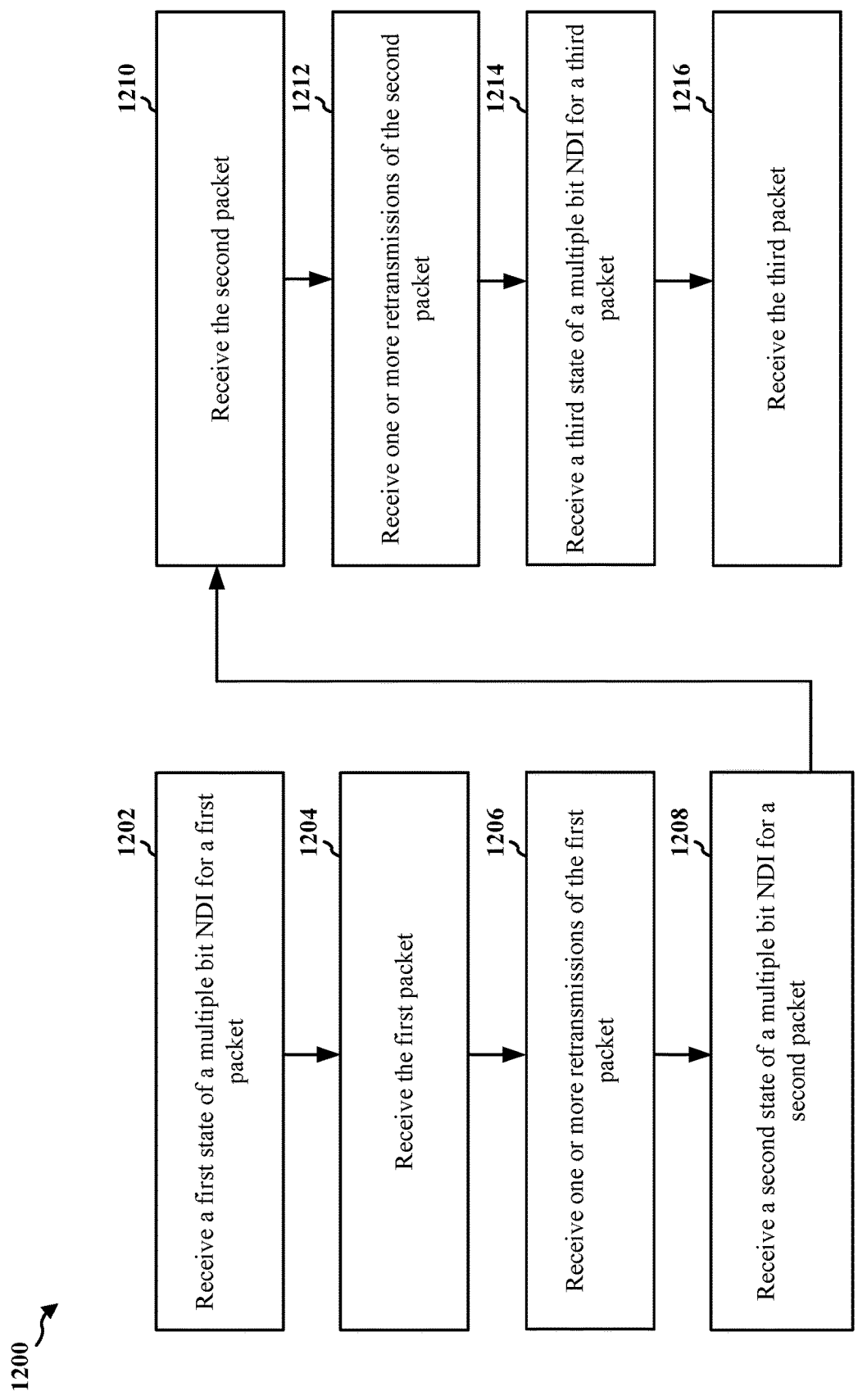
FIG. 12 is a flowchart of a method of wireless communication at a second device, in accordance with the teachings disclosed herein.

FIG. 12 is a flowchart 1200 of a method of wireless communication, with a first device, at a second device. In some examples, the second device may comprise a receiver or a UE (e.g., the UE 104, the UE 350, and/or an apparatus 1302 of FIG. 13). The UE may receive communication from a base station, in some examples. In other examples, the UE may receive communication from another UE. In some examples, the method may be performed by a base station. The method may facilitate improving communication by reducing ambiguity at the second device of whether a transmission corresponds to an initial transmission of a packet or a retransmission of the packet.

At 1202, the second device receives a first state of a multiple bit NDI for a first packet, as described in connection with the multiple bit NDI 712 of FIG. 7. For example, 1202 may be performed by an NDI reception component 1340 of the apparatus 1302 of FIG. 13. The multiple bit NDI may be configured to indicate more than two different states for indicating a new packet. The multiple bit NDI may rotate through the different states to indicate different packets. The multiple bit NDI may indicate a HARQ transmission attempt, as described in connection with the second value "b" of the multiple NDIs 620a-620d of FIG. 6. For example, the multiple NDI may include a combination of a first set of bits (e.g., a first value "a") and a second set of bits (e.g., a second value "b"). The first set of bits may indicate a packet and the second set of bits may indicate the HARQ transmission attempt.

In some examples, the second device may receive the multiple bit NDI in downlink control information. In other examples, the second device may receive the multiple bit NDI in sidelink control information. In other examples, the second device may receive the multiple bit NDI in uplink control information.

At 1204, the second device receives the first packet, for example, based on the state of the NDI, as described in connection with the first downlink transmission 710 of FIG. 7. For example, 1204 may be performed by a packet reception component 1342 of the apparatus 1302 of FIG. 13.

The first packet may include one or more code blocks. The first packet may be an initial transmission (e.g., rather than a retransmission).

As illustrated, at 1206, the second device may receive one or more retransmissions of the first packet, as described in connection with the third packet 510c of FIG. 5 and/or the third packet 610c of FIG. 6. For example, 1206 may be performed by a retransmission component 1344 of the apparatus 1302 of FIG. 13.

At 1208, the second device receives a second state of the multiple bit NDI for a second packet, as described in connection with the multiple bit NDI 742 of FIG. 7. For example, 1208 may be performed by the NDI reception component 1340 of the apparatus 1302 of FIG. 13. The second state may be different than the first state, as described in connection with, for example, the second NDI 520b and the first NDI 520a of FIG. 5 and/or the second NDI 620b and the first NDI 620a of FIG. 6. The second device may receive the multiple bit NDI in downlink control information, sidelink control information, and/or uplink control information At 1210, the second device receives the second packet, for example, based on the second state of the NDI, as described in connection with the second downlink transmission 740 of FIG. 7. For example, 1210 may be performed by the packet reception component 1342 of the apparatus 1302 of FIG. 13.

In some examples, the first packet and the second packet may comprise initial transmissions (e.g., rather than transmissions), as described in connection with the example first packet 510a and the second packet 510b of FIG. 5 and/or the first packet 610a and the second packet 610b of FIG. 6. In such examples, the multiple bit NDI may be rotated through the more than two different states to indicate different packets, as described in connection with the second NDI 520b of FIG. 5 and/or the second NDI 620b of FIG. 6.

In some examples, the second packet, as received at 1210, may be a retransmission of the first packet, as described in connection with the third packet 510c of FIG. 5 and/or the third packet 610c of FIG. 6. In some examples, the multiple bit NDI may indicate a HARQ transmission attempt, as described in connection with the second value "b" of the multiple NDIs 620a-620d of FIG. 6. For example, the multiple NDI may include a combination of a first set of bits (e.g., a first value "a") and a second set of bits (e.g., a second value "b"). The first set of bits may indicate a packet and the second set of bits may indicate the HARQ transmission attempt.

As illustrated at 1212, the second device may receive one or more retransmissions of the second packet, as described in connection with the third packet 510c of FIG. 5 and/or the third packet 610c of FIG. 6. For example, 1212 may be performed by the retransmission component 1344 of the apparatus 1302 of FIG. 13.

Whereas a single bit NDI may be limited to two states, as illustrated at 1214, the second device may receive a third state of the multiple bit NDI for a third packet, as described in connection in with the fourth NDI 520d of FIG. 5 and/or the fourth NDI 620d of FIG. 6. For example, 1214 may be performed by the NDI reception component 1340 of the apparatus 1302 of FIG. 13. The third state of the multiple bit NDI may be different than the first state and the second state.

At 1216, the second device may receive the third packet, for example, based on the third state of the multiple bit NDI, as described in connection with the fourth packet 510d of FIG. 5 and/or the fourth packet 610d of FIG. 6. For example, 1216 may be performed by the packet reception component 1342 of the apparatus 1302 of FIG. 13. In some examples, the third packet may be an initial packet. In other examples, the third packet may be a retransmission.

Figure 13:
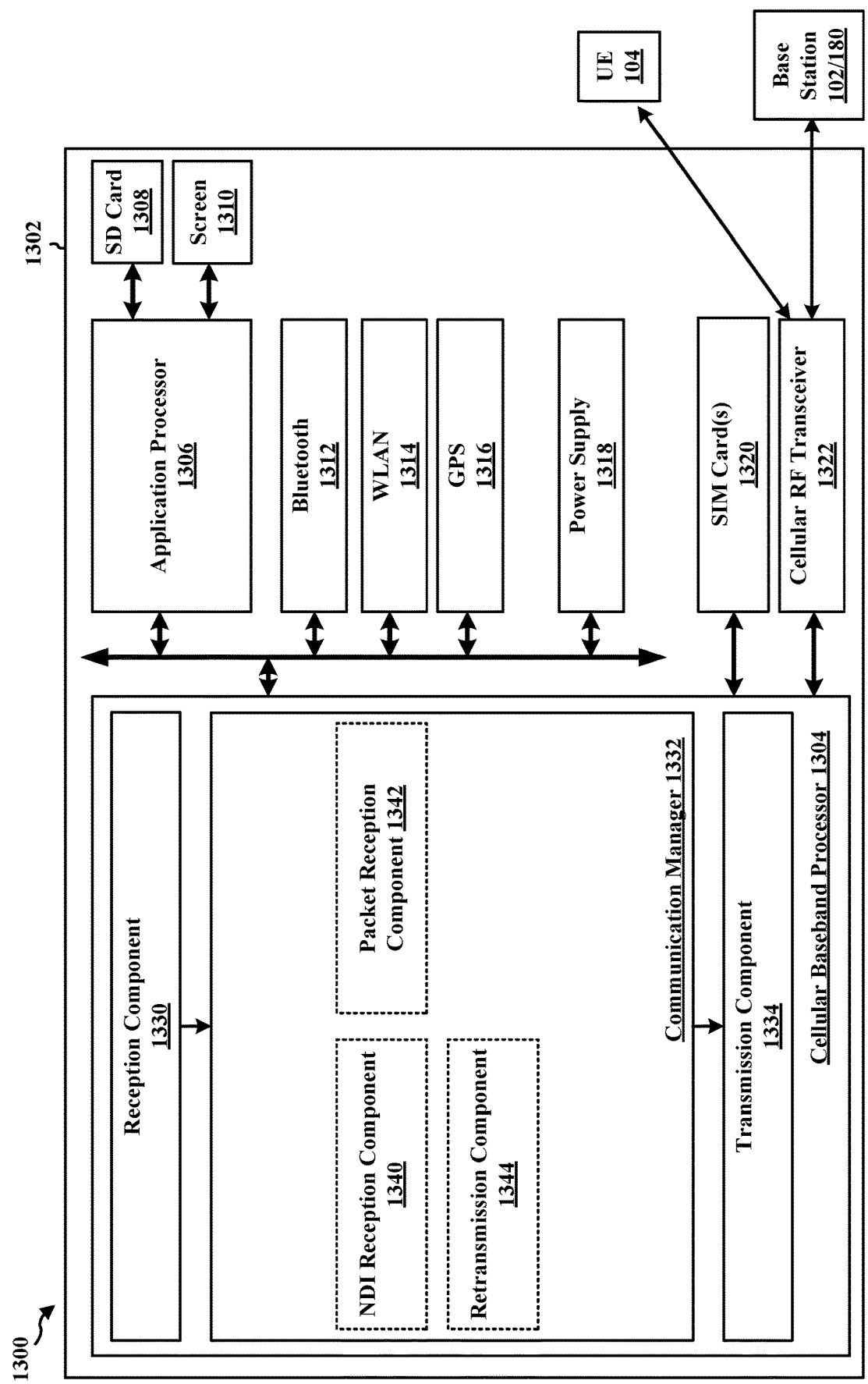
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see the UE 350 of FIG. 3) and include the additional modules of the apparatus 1302.

The communication manager 1332 includes an NDI reception component 1340 that is configured to receive a first state of a multiple bit NDI for a first packet, for example, as described in connection with 1102 of FIG. 11 and/or 1202 of FIG. 12. The multiple bit NDI may indicate more than two different states for indicating a new packet. The example NDI reception component 1340 may be further configured to receive a second state of the multiple bit NDI for a second packet, the second state being different than the first state, for example, as described in connection with 1106 of FIG. 11 and/or 1208 of FIG. 12. The example NDI reception component 1340 may be further configured to receive a third state of the multiple bit NDI for a third packet, the third state being different than the first state and the second state, for example, as described in connection with 1214 of FIG. 12.

The communication manager 1332 also includes a packet reception component 1342 that is configured to receive the first packet based on the first state of the multiple bit NDI, for example, as described in connection with 1104 of FIG. 11 and/or 1204 of FIG. 12. The example packet reception component 1342 may be further configured to receive the second packet based on the second state of the multiple bit NDI, for example, as described in connection with 1108 of FIG. 11 and/or 1210 of FIG. 12. The example packet reception component 1342 may be further configured to receive the third packet based on the third state of the multiple bit NDI, for example, as described in connection with 1216 of FIG. 12.

The communication manager 1332 also includes a retransmission component 1344 that is configured to receive one or more retransmissions of the first packet, for example, as described in connection with 1206 of FIG. 12. The example retransmission component 1344 may be further configured to receive one or more retransmissions of the second packet, for example, as described in connection with 1212 of FIG. 12.

The apparatus may include additional components that perform each of the blocks of the algorithm in the aforementioned flowcharts of FIGS. 11 and/or 12. As such, each block in the aforementioned flowcharts of FIGS. 11 and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving a first state of a multiple bit NDI for a first packet. The example apparatus 1302 also includes means for receiving the first packet based on the first state of the multiple bit NDI. The example apparatus 1302 also includes means for receiving a second state of the multiple bit NDI for a second packet. The example apparatus 1302 also includes means for receiving the second packet based on the second state of the multiple bit NDI.

In another configuration, the example apparatus 1302 also includes means for receiving a third state of the multiple bit NDI for a third packet. The example apparatus 1302 also includes means for receiving the third packet based on the third state of the multiple bit NDI.

In another configuration, the example apparatus 1302 also includes means for receiving one or more retransmissions of at least the first packet or the second packet.

In another configuration, the apparatus 1302, and in particular the cellular baseband processor 1304, includes means for receiving a first state of a multiple bit NDI for a first packet, the multiple bit NDI indicating more than two different states for indicating a new packet. The example apparatus 1302 also includes means for receiving the first packet based on the first state of the multiple bit NDI. The example apparatus 1302 also includes means for receiving a second state of the multiple bit NDI for a second packet, the second state being different than the first state. The example apparatus 1302 also includes means for receiving the second packet based on the second state of the multiple bit NDI.

In another configuration, the example apparatus 1302 also includes means for receiving a third state of the multiple bit NDI for a third packet, the third state being different than the first state and the second state. The example apparatus 1302 also includes means for receiving the third packet based on the third state of the multiple bit NDI.

In another configuration, the example apparatus 1302 also includes means for receiving the multiple bit NDI in downlink control information or sidelink control information.

In another configuration, the example apparatus 1302 also includes means for receiving one or more retransmissions of at least the first packet or the second packet.

The aforementioned means may be one or more of the aforementioned components of the apparatus 1302 configured to perform the functions recited by the aforementioned means. As described supra, the apparatus 1302 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Aspects presented herein may improve communication between a transmitter and a receiver by indicating a multiple bit NDI that rotates (e.g., cycles or traverses) through more than two different states for indicating a new packet. The transmitter may be configured to transmit downlink transmissions to the receiver and also transmit the multiple bit NDI. In some examples, the NDI may also include a hybrid automatic repeat request (HARM) attempt identifier. The multiple bit NDI may be configured to indicate to the receiver of whether the transmitter is transmitting a new (e.g., an initial) transmission of a packet or transmitting a retransmission. For example, for an M-bit NDI, the transmitter may rotate (e.g., cycle or traverse) through N states relative to a prior transmission, where N includes the states $0, 1, \ldots 2^M-1$, to indicate when new data (e.g., a new packet) is being sent rather than a retransmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first device, comprising: transmitting a first state of a multiple bit NDI for a first packet; transmitting the first packet; transmitting a second state of the multiple bit NDI for a second packet; and transmitting the second packet.

Aspect 2 is the method of aspect 1, further including that the multiple bit NDI provides more than two different states for indicating a new packet.

Aspect 3 is the method of any of aspect 1 or aspect 2, further including that the multiple bit NDI rotates through the more than two different states to indicate different packets.

Aspect 4 is the method of any of aspects 1 to 3, further including: transmitting a third state of the multiple bit NDI for a third packet; and transmitting the third packet.

Aspect 5 is the method of any of aspects 1 to 4, further including that the multiple bit NDI is transmitted in downlink control information.

Aspect 6 is the method of any of aspects 1 to 5, further including: transmitting one or more retransmission of at least the first packet or the second packet.

Aspect 7 is the method of any of aspects 1 to 6, further including that the first packet and the second packet are initial transmissions.

Aspect 8 is the method of any of aspects 1 to 7, further including that the second packet is a retransmission of the first packet.

Aspect 9 is the method of any of aspects 1 to 8, further including that the multiple bit NDI indicates a HARQ transmission attempt.

Aspect 10 is the method of any of aspects 1 to 9, further including that the multiple NDI comprises a combination of a first set of bits and a second set of bits, wherein the first set of bits indicates a packet and the second set of bits indicates the HARQ transmission attempt.

Aspect 11 is an apparatus for wireless communication including a memory and at least one processor coupled to a memory, the memory and the at least one processor configured to implement a method as in any of aspects 1 to 10.

Aspect 12 is an apparatus for wireless communication including means for implementing a method as in any of aspects 1 to 10.

Aspect 13 is a non-transitory computer-readable storage medium storing computer executable code, where the code, when executed, causes a processor to implement a method as in any of aspects 1 to 10.

Aspect 14 is a method of wireless communication at a first device, comprising: receiving a first state of a multiple bit new data indicator (NDI) for a first packet; receiving the first packet based on the first state of the multiple bit NDI; receiving a second state of the multiple bit NDI for a second packet; and receiving the second packet based on the second state of the multiple bit NDI.

Aspect 15 is the method of aspect 14, further including that the multiple bit NDI provides more than two different states for indicating a new packet.

Aspect 16 is the method of any of aspect 14 or aspect 15, further including that the multiple bit NDI rotates through the more than two different states to indicate different packets.

Aspect 17 is the method of any of aspects 14 to 16, further including: receiving a third state of the multiple bit NDI for a third packet; and receiving the third packet based on the third state of the multiple bit NDI.

Aspect 18 is the method of any of aspects 14 to 17, further including that the multiple bit NDI is received in downlink control information.

Aspect 19 is the method of any of aspects 14 to 18, further including: receiving one or more retransmission of at least the first packet or the second packet.

Aspect 20 is the method of any of aspects 14 to 19, further including that the second packet is a retransmission of the first packet.

Aspect 21 is the method of any of aspects 14 to 20, further including that the multiple bit NDI indicates a HARQ transmission attempt.

Aspect 22 is the method of any of aspects 14 to 21, further including that the multiple NDI comprises a combination of a first set of bits and a second set of bits, wherein the first set of bits indicates a packet and the second set of bits indicates the HARQ transmission attempt.

Aspect 23 is an apparatus for wireless communication including a memory and at least one processor coupled to a memory, the memory and the at least one processor configured to implement a method as in any of aspects 14 to 22.

Aspect 24 is an apparatus for wireless communication including means for implementing a method as in any of aspects 14 to 22.

Aspect 25 is a non-transitory computer-readable storage medium storing computer executable code, where the code, when executed, causes a processor to implement a method as in any of aspects 14 to 22.

Aspect 26 is a method of wireless communication at a first device, comprising: transmitting a first state of a multiple bit NDI for a first packet, the multiple bit NDI indicating more than two different states for indicating a new packet; transmitting the first packet; transmitting a second state of the multiple bit NDI for a second packet, the second state being different than the first state; and transmitting the second packet.

Aspect 27 is the method of aspect 26, further including rotating the multiple bit NDI through the more than two different states to indicate different packets.

Aspect 28 is the method of any of aspect 26 or aspect 27, further including: transmitting a third state of the multiple bit NDI for a third packet, the third state being different than the first state and the second state; and transmitting the third packet.

Aspect 29 is the method of any of aspects 26 to 28, further including transmitting the multiple bit NDI in downlink control information or sidelink control information that comprises the multiple bit NDI.

Aspect 30 is the method of any of aspects 26 to 29, further including: transmitting one or more retransmissions of at least the first packet or the second packet.

Aspect 31 is the method of any of aspects 26 to 30, further including that the first packet and the second packet are initial transmissions.

Aspect 32 is the method of any of aspects 26 to 30, further including that the second packet is a retransmission of the first packet.

Aspect 33 is the method of any of aspects 26 to 32, further including that the multiple bit NDI indicates a HARQ transmission attempt.

Aspect 34 is the method of any of aspects 26 to 33, further including that the multiple bit NDI comprises a combination of a first set of bits and a second set of bits, the first set of bits indicating a packet and the second set of bits indicating the HARQ transmission attempt.

Aspect 35 is an apparatus for wireless communication including a memory and at least one processor coupled to a memory, the memory and the at least one processor configured to implement a method as in any of aspects 26 to 34.

Aspect 36 is an apparatus for wireless communication including means for implementing a method as in any of aspects 26 to 34.

Aspect 37 is a non-transitory computer-readable storage medium storing computer executable code, where the code, when executed, causes a processor to implement a method as in any of aspects 26 to 34.

Aspect 38 is a method of wireless communication, with a first device, at a second device, comprising: receiving a first state of a multiple bit NDI for a first packet, the multiple bit NDI indicating more than two different states for indicating a new packet; receiving the first packet based on the first state of the multiple bit NDI; receiving a second state of the multiple bit NDI for a second packet, the second state being different than the first state; and receiving the second packet based on the second state of the multiple bit NDI.

Aspect 39 is the method of aspect 38, further including that the multiple bit NDI rotates through the more than two different states to indicate different packets.

Aspect 40 is the method of any of aspect 38 or aspect 39, further including: receiving a third state of the multiple bit NDI for a third packet, the third state being different than the first state and the second state; and receiving the third packet based on the third state of the multiple bit NDI.

Aspect 41 is the method of any of aspects 38 to 40, further including: receiving the multiple bit NDI in downlink control information or sidelink control information.

Aspect 42 is the method of any of aspects 38 to 41, further including: receiving one or more retransmissions of at least the first packet or the second packet.

Aspect 43 is the method of any of aspects 38 to 42, further including that the second packet is a retransmission of the first packet.

Aspect 44 is the method of any of aspects 38 to 43, further including that the multiple bit NDI indicates a HARQ transmission attempt.

Aspect 45 is the method of any of aspects 38 to 44, further including that the multiple bit NDI comprises a combination of a first set of bits and a second set of bits, the first set of bits indicating a packet and the second set of bits indicating the HARQ transmission attempt.

Aspect 46 is an apparatus for wireless communication including a memory and at least one processor coupled to a memory, the memory and the at least one processor configured to implement a method as in any of aspects 38 to 45.

Aspect 47 is an apparatus for wireless communication including means for implementing a method as in any of aspects 38 to 45.

Aspect 48 is a non-transitory computer-readable storage medium storing computer executable code, where the code, when executed, causes a processor to implement a method as in any of aspects 38 to 45.

What is claimed is:

1. An apparatus for wireless communication at a first device, comprising:
   memory; and
   one or more processors coupled to the memory, the one or more processors configured to cause the first device to:
      transmit a first state of a multiple bit new data indicator (NDI) for a first packet, wherein the multiple bit NDI is configured to indicate more than two different states and the first state indicates that the first packet is a new packet;
      transmit the first packet;
      transmit a second state of the multiple bit NDI for a second packet that is a retransmission of the first packet, wherein the second state is different than the first state;
      transmit the second packet;
      transmit a third state of the multiple bit NDI for a third packet, wherein the third state is different than the first state and the second state; and
      transmit the third packet that is an additional retransmission of the first packet.

2. The apparatus of claim 1, wherein the one or more processors are further configured to cause the first device to:
   rotate the multiple bit NDI through the more than two different states to indicate different retransmissions of the first packet.

3. The apparatus of claim 1, wherein the one or more processors are further configured to cause the first device to transmit the multiple bit NDI in downlink control information or sidelink control information.

4. The apparatus of claim 1, wherein the one or more processors are further configured to cause the first device to:
   transmit one or more retransmissions of at least the first packet or the second packet.

5. The apparatus of claim 1, wherein the multiple bit NDI indicates a hybrid automatic repeat request (HARQ) transmission attempt.

6. The apparatus of claim 1, wherein the one or more processors are configured individually or in combination to cause the first device to transmit the first state of the multiple bit NDI, transmit the first packet, transmit the second state of the multiple bit NDI, and transmit the second packet.

7. An apparatus for wireless communication at a first device, comprising:
   memory; and
   one or more processors coupled to the memory, the one or more processors configured to cause the first device to:
      transmit a first state of a multiple bit new data indicator (NDI) for a first packet, wherein the multiple bit NDI is configured to indicate more than two different states and the first state indicates that the first packet is a new packet;
      transmit the first packet;
      transmit a second state of the multiple bit NDI for a second packet that is a retransmission of the first packet, wherein the second state is different than the first state; and
      transmit the second packet,
      wherein the multiple bit NDI comprises a combination of a first set of bits and a second set of bits, the first set of bits configured to indicate a packet and the second set of bits configured to indicate a hybrid automatic repeat request (HARQ) transmission attempt.

8. The apparatus of claim 7, wherein the multiple bit NDI is comprised in downlink control information or sidelink control information.

9. A method of wireless communication at a first device, comprising:
transmitting a first state of a multiple bit new data indicator (NDI) for a first packet, wherein the multiple bit NDI is configured to indicate more than two different states and the first state indicates that the first packet is a new packet;
transmitting the first packet;
transmitting a second state of the multiple bit NDI for a second packet that is a retransmission of the first packet, wherein the second state is different than the first state;
transmitting the second packet;
transmitting a third state of the multiple bit NDI for a third packet, wherein the third state is different than the first state and the second state; and
transmitting the third packet that is an additional retransmission of the first packet.

10. The method of claim 9, further comprising rotating the multiple bit NDI through the more than two different states to indicate different retransmissions of the first packet.

11. The method of claim 9, further comprising:
transmitting the multiple bit NDI in downlink control information or sidelink control information that comprises the multiple bit NDI.

12. The method of claim 9, further comprising:
transmitting one or more retransmissions of at least the first packet or the second packet.

13. The method of claim 9, wherein the multiple bit NDI indicates a hybrid automatic repeat request (HARQ) transmission attempt.

14. A method of wireless communication at a first device, comprising:
transmitting a first state of a multiple bit new data indicator (NDI) for a first packet, wherein the multiple bit NDI is configured to indicate more than two different states and the first state indicates that the first packet is a new packet;
transmitting the first packet;
transmitting a second state of the multiple bit NDI for a second packet that is a retransmission of the first packet, wherein the second state is different than the first state; and
transmitting the second packet,
wherein the multiple bit NDI comprises a combination of a first set of bits and a second set of bits, the first set of bits indicating a packet and the second set of bits indicating a hybrid automatic repeat request (HARQ) HARQ transmission attempt.

15. The method of claim 14, wherein the multiple bit NDI is comprised in downlink control information or sidelink control information.

16. An apparatus for wireless communication, with a first device, at a second device, comprising:
memory; and
one or more processors coupled to the memory, the one or more processors configured to cause the second device to:
receive a first state of a multiple bit new data indicator (NDI) for a first packet, wherein the multiple bit NDI is configured to indicate more than two different states and the first state indicates that the first packet is a new packet;
receive the first packet based on the first state of the multiple bit NDI;
receive a second state of the multiple bit NDI for a second packet that is a retransmission of the first packet, wherein the second state is different than the first state;
receive the second packet based on the second state of the multiple bit NDI;
receive a third state of the multiple bit NDI for a third packet, wherein the third state is different than the first state and the second state; and
receive the third packet, that is an additional retransmission of the first packet. based on the third state of the multiple bit NDI.

17. The apparatus of claim 16, wherein the multiple bit NDI rotates through the more than two different states to indicate different retransmissions of the first packet.

18. The apparatus of claim 16, wherein the one or more processors are configured to cause the second device to receive the multiple bit NDI in downlink control information or sidelink control information.

19. The apparatus of claim 16, wherein the one or more processors are further configured to cause the second device to:
receive one or more retransmissions of the first packet.

20. The apparatus of claim 16, wherein the multiple bit NDI indicates a hybrid automatic repeat request (HARQ) transmission attempt.

21. The apparatus of claim 16, wherein the one or more processors are configured individually or in combination to cause the second device to receive the first state of the multiple bit NDI, receive the first packet, receive the second state of the multiple bit NDI, and receive the second packet.

22. An apparatus for wireless communication, with a first device, at a second device, comprising:
memory; and
one or more processors coupled to the memory, the one or more processors configured to cause the second device to:
receive a first state of a multiple bit new data indicator (NDI) for a first packet, wherein the multiple bit NDI is configured to indicate more than two different states and the first state indicates that the first packet is a new packet;
receive the first packet based on the first state of the multiple bit NDI;
receive a second state of the multiple bit NDI for a second packet that is a retransmission of the first packet, wherein the second state is different than the first state; and
receive the second packet based on the second state of the multiple bit NDI,
wherein the multiple bit NDI comprises a combination of a first set of bits and a second set of bits, the first set of bits configured to indicate a packet and the second set of bits configured to indicate a hybrid automatic repeat request (HARQ) transmission attempt.

23. The apparatus of claim 22, wherein the multiple bit NDI is comprised in downlink control information or sidelink control information.

24. A method of wireless communication, with a first device, at a second device, comprising:

receiving a first state of a multiple bit new data indicator (NDI) for a first packet, wherein the multiple bit NDI is configured to indicate more than two different states and the first state indicates that the first packet is a new packet;

receiving the first packet based on the first state of the multiple bit NDI;

receiving a second state of the multiple bit NDI for a second packet that is a retransmission of the first packet, the second state being different than the first state; receiving the second packet based on the second state of the multiple bit NDI;

receiving a third state of the multiple bit NDI for a third packet, wherein the third state is different than the first state and the second state; and receiving the third packet, that is an additional retransmission of the first packet, based on the third state of the multiple bit NDI.

25. The method of claim 24, wherein the multiple bit NDI rotates through the more than two different states to indicate different retransmissions of the first packet.

26. The method of claim 24, further comprising:
receiving one or more retransmissions of the first packet.

27. The method of claim 24, wherein the multiple bit NDI is comprised in downlink control information or sidelink control information.

28. The method of claim 24, wherein the multiple bit NDI indicates a hybrid automatic repeat request (HARQ) transmission attempt.

29. A non-transitory computer-readable storage medium comprising computer-executable code at a first device, the computer-executable code, when executed by one or more processors, causes the first device to:

transmit a first state of a multiple bit new data indicator (NDI) for a first packet, wherein the multiple bit NDI is configured to indicate more than two different states to indicate a respective and the first state indicates that the first packet is a new packet;

transmit the first packet;

transmit a second state of the multiple bit NDI for a second packet that is a retransmission of the first packet, wherein the second state is different than the first state;

transmit the second packet;

transmit a third state of the multiple bit NDI for a third packet, the third state being different than the first state and the second state; and transmit the third packet that is an additional retransmission of the first packet.

30. The non-transitory computer-readable storage medium of claim 29, wherein the computer-executable code, when executed by the one or more processors, causes the first device to:

rotate the multiple bit NDI through the more than two different states to indicate different retransmissions of the first packet.

31. The non-transitory computer-readable storage medium of claim 29, wherein the multiple bit NDI indicates a hybrid automatic repeat request (HARQ) transmission attempt.

32. The non-transitory computer-readable storage medium of claim 29, wherein the multiple bit NDI is comprised in downlink control information or sidelink control information.

33. A non-transitory computer-readable storage medium comprising computer-executable code at a first device, the computer-executable code, when executed by one or more processors, causes the first device to:

transmit a first state of a multiple bit new data indicator (NDI) for a first packet, wherein the multiple bit NDI is configured to indicate more than two different states to indicate a respective and the first state indicates that the first packet is a new packet;

transmit the first packet;

transmit a second state of the multiple bit NDI for a second packet that is a retransmission of the first packet, wherein the second state is different than the first state; and transmit the second packet, wherein the multiple bit NDI comprises a combination of a first set of bits and a second set of bits, the first set of bits configured to indicate a packet and the second set of bits configured to indicate a hybrid automatic repeat request (HARQ) transmission attempt.

34. The non-transitory computer-readable storage medium of claim 33, wherein the multiple bit NDI is comprised in downlink control information or sidelink control information.

35. A non-transitory computer-readable storage medium comprising computer-executable code for wireless communication, with a first device, at a second device, the computer-executable code, when executed by one or more processors, causes the second device to:

receive a first state of a multiple bit new data indicator (NDI) for a first packet, wherein the multiple bit NDI is configured to indicate more than two different states and the first state indicates that the first packet is a new packet;

receive the first packet based on the first state of the multiple bit NDI;

receive a second state of the multiple bit NDI for a second packet that is a retransmission of the first packet, wherein the second state is different than the first state;

receive the second packet based on the second state of the multiple bit NDI, receive a third state of the multiple bit NDI for a third packet, wherein the third state is different than the first state and the second state; and receive the third packet, that is an additional retransmission of the first packet, based on the third state of the multiple bit NDI.

36. The non-transitory computer-readable storage medium of claim 35, wherein the multiple bit NDI rotates through the more than two different states to indicate different retransmissions of the first packet.

37. The non-transitory computer-readable storage medium of claim 35, wherein the multiple bit NDI indicates a hybrid automatic repeat request (HARQ) transmission attempt.

38. The non-transitory computer-readable storage medium of claim 35, wherein the multiple bit NDI is comprised in downlink control information or sidelink control information.

39. A non-transitory computer-readable storage medium comprising computer-executable code for wireless communication, with a first device, at a second device, the computer-executable code, when executed by one or more processors, causes the second device to:

receive a first state of a multiple bit new data indicator (NDI) for a first packet, wherein the multiple bit NDI is configured to indicate more than two different states and the first state indicates that the first packet is a new packet;

receive the first packet based on the first state of the multiple bit NDI;

receive a second state of the multiple bit NDI for a second packet that is a retransmission of the first packet, wherein the second state is different than the first state; and receive the second packet based on the second state of the multiple bit NDI, wherein the multiple bit NDI comprises a combination of a first set of bits and a second set of bits, the first set of bits configured to indicate a packet and the second set of bits configured to indicate a hybrid automatic repeat request (HARQ) transmission attempt.

40. The non-transitory computer-readable storage medium of claim 39, wherein the multiple bit NDI is comprised in downlink control information or sidelink control information.

41. A method of wireless communication, with a first device, at a second device, comprising:

receiving a first state of a multiple bit new data indicator (NDI) for a first packet, wherein the multiple bit NDI is configured to indicate more than two different states and the first state indicates that the first packet is a new packet;

receiving the first packet based on the first state of the multiple bit NDI;

receiving a second state of the multiple bit NDI for a second packet that is a retransmission of the first packet, wherein the second state is different than the first state; and receiving the second packet based on the second state of the multiple bit NDI, wherein the multiple bit NDI comprises a combination of a first set of bits and a second set of bits, the first set of bits configured to indicate a packet and the second set of bits configured to indicate a hybrid automatic repeat request (HARQ) transmission attempt.

42. The method of claim 41, wherein the multiple bit NDI is comprised in downlink control information or sidelink control information.

* * * * *